US011201773B1

(12) United States Patent
Zach et al.

(10) Patent No.: US 11,201,773 B1
(45) Date of Patent: Dec. 14, 2021

(54) INCREMENTAL PEAK SUPPRESSION INFORMATION MESSAGE

(71) Applicant: QUALCOMM Incorporated, San Diego, CA (US)

(72) Inventors: Noam Zach, Kiryat Ono (IL); Guy Wolf, Rosh Haayin (IL); Ory Eger, Tel Aviv (IL); Sharon Levy, Binyamina (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/887,471

(22) Filed: May 29, 2020

(51) Int. Cl.
*H04L 27/26* (2006.01)
*H04L 1/00* (2006.01)
*H04W 72/08* (2009.01)
*H04W 72/04* (2009.01)

(52) U.S. Cl.
CPC .......... *H04L 27/2623* (2013.01); *H04L 1/001* (2013.01); *H04L 1/0004* (2013.01); *H04W 72/042* (2013.01); *H04W 72/082* (2013.01)

(58) Field of Classification Search
CPC ... H04L 27/2623; H04L 1/0004; H04L 1/001; H04L 72/082; H04W 72/042
See application file for complete search history.

(56) References Cited

U.S. PATENT DOCUMENTS

| 2009/0180574 | A1 | 7/2009 | Futagi et al. |
| 2010/0316162 | A1* | 12/2010 | Higuchi ................. H04L 27/00 |
| 2013/0279439 | A1 | 10/2013 | Takahashi et al. |

FOREIGN PATENT DOCUMENTS

| EP | 2439866 A1 | 4/2012 |
| JP | 2001274768 A | 10/2001 |

OTHER PUBLICATIONS

International Search Report and Written Opinion—PCT/US2021/027147—ISA/EPO—dated Jul. 16, 2021.

* cited by examiner

*Primary Examiner* — Ronald B Abelson
(74) *Attorney, Agent, or Firm* — Arent Fox, LLP

(57) ABSTRACT

A transmitting device may reduce a peak to average power ratio (PAPR) ratio by clipping samples that have an amplitude exceeding a threshold. For a downlink transmission, the transmitting device may transmit an incremental peak suppression information message (PSIM) to multiple user equipments (UEs). A UE may receive downlink control information (DCI) indicating a data and a modulation and coding scheme (MCS) for the UE, and at least a first incremental PSIM. The UE may decode at least the first incremental PSIM that is applicable to a MCS lower than or equal to the MCS for the UE. The UE may determine whether to decode one or more subsequent incremental PSIMs based on the MCS for the UE. The UE may apply peak information from the incremental PSIMs to the data channel. The UE may decode the data channel based on the MCS for the UE.

30 Claims, 12 Drawing Sheets

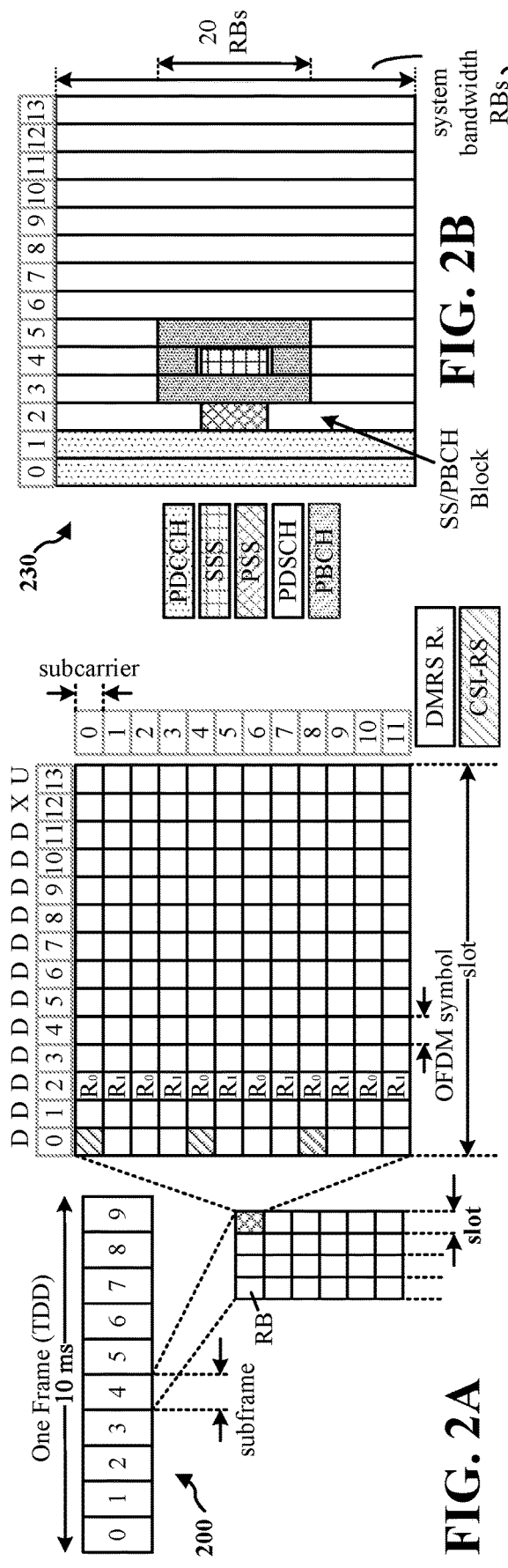
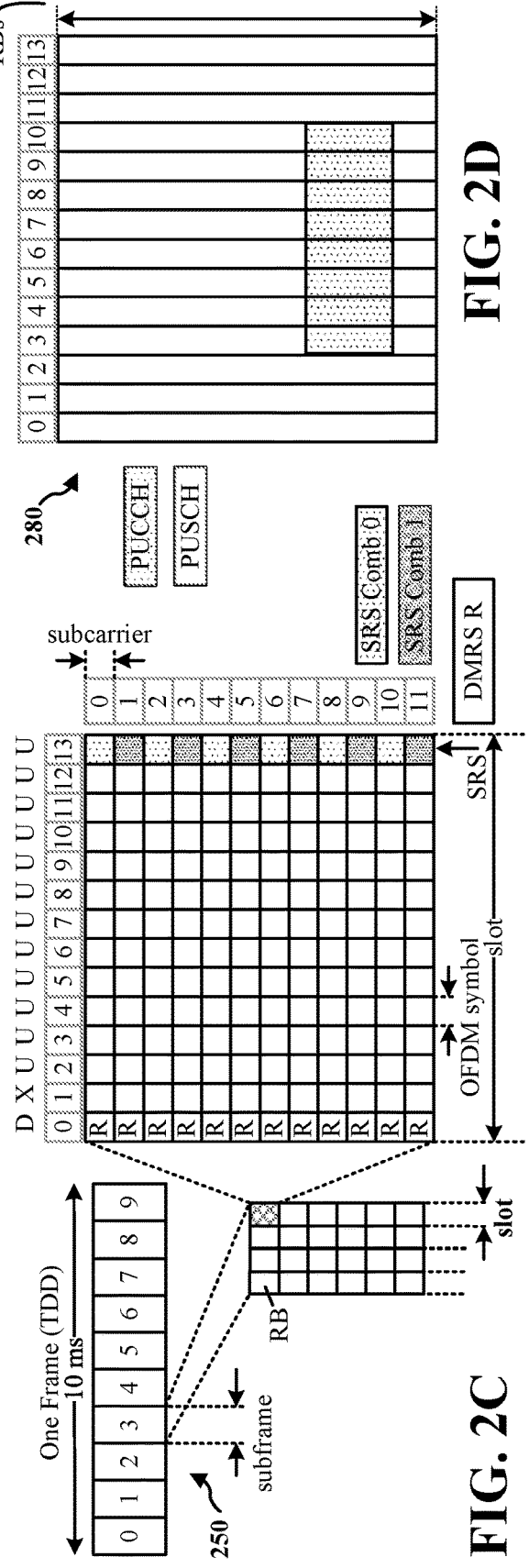
FIG. 2A
FIG. 2B
FIG. 2C
FIG. 2D

INCREMENTAL PEAK SUPPRESSION INFORMATION MESSAGE

BACKGROUND

Technical Field

The present disclosure relates generally to communication systems, and more particularly, to an incremental peak suppression information message (PSIM) for peak to average power ratio (PAPR) reduction.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the disclosure provides a method of wireless communication for a user equipment (UE). The method may include receiving one or more downlink control information (DCI) indicating a data channel for the UE, a modulation and coding scheme (MCS) for the UE, and at least a first incremental peak suppression information message (PSIM) for the data channel. The method may include decoding at least the first incremental PSIM, the first incremental PSIM being applicable to a MCS lower than or equal to the MCS for the UE. The method may include determining whether to decode one or more subsequent incremental PSIMs based on the MCS for the UE. The method may include receiving the data channel. The method may include applying peak information from the first incremental PSIM and any decoded subsequent incremental PSIMs to the data channel to generate a reconstructed data channel. The method may include decoding the reconstructed data channel based on the MCS for the UE.

The disclosure also provides an apparatus (e.g., a UE) including a memory storing computer-executable instructions and at least one processor configured to execute the computer-executable instructions to perform the above method, an apparatus including means for performing the above method, and a non-transitory computer-readable medium storing computer-executable instructions for performing the above method.

In an aspect, the disclosure provides a method of wireless communication for a base station. The method may include generating a data channel including a transport block for each of two or more UEs, each transport block associated with a MCS for a respective UE. The method may include performing peak suppression on the data channel to generate a clipped data channel signal and clipped peak information. The method may include assigning to each UE a portion of the clipped peak information based on the MCS for the respective UE. The method may include encoding the clipped peak information into a plurality of incremental PSIMs, each incremental PSIM including the portion of the clipped peak information assigned to at least the respective UE and encoded based on a MCS lower than the MCS for the respective UE. The method may include transmitting the clipped data channel signal, the plurality of incremental PSIMs, and a respective DCI for each UE indicating the MCS for the respective UE and the respective transport block for the respective UE.

The disclosure also provides an apparatus (e.g., a base station) including a memory storing computer-executable instructions and at least one processor configured to execute the computer-executable instructions to perform the above method, an apparatus including means for performing the above method, and a non-transitory computer-readable medium storing computer-executable instructions for performing the above method.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first 5G/NR frame.

FIG. 2B is a diagram illustrating an example of DL channels within a 5G/NR subframe.

FIG. 2C is a diagram illustrating an example of a second 5G/NR frame.

FIG. 2D is a diagram illustrating an example of a 5G/NR subframe.

DETAILED DESCRIPTION

Figure 1:
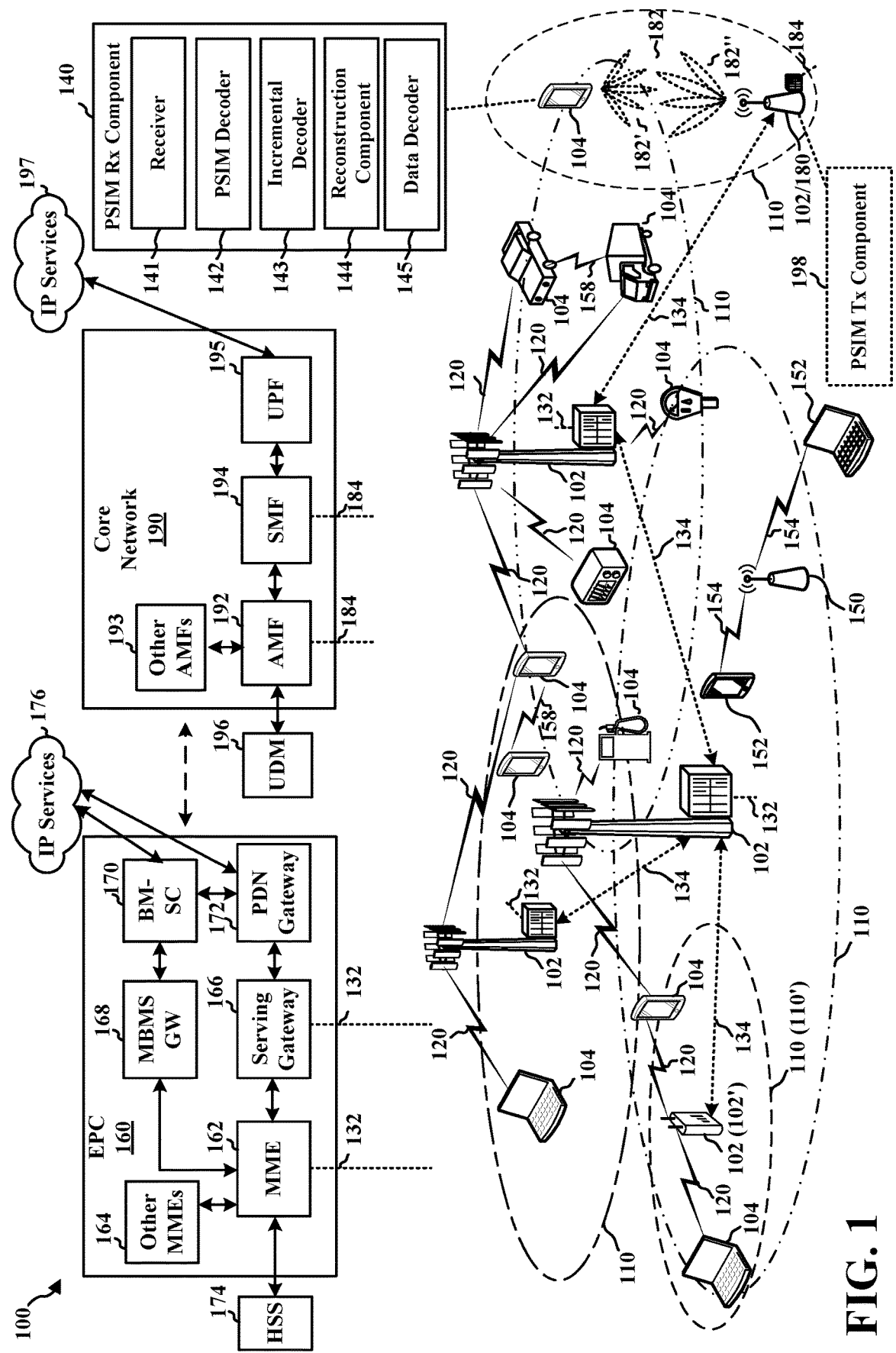
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Power consumption is a concern for wireless devices including both base stations and user equipment (UE). Although a base station may have a constant power supply, power consumption may be a significant cost for a network operator. Orthogonal frequency division multiple access (OFDMA) has many advantages such as enabling channel estimation at the receiver, flexibility in utilizing the available time/frequency resources, etc. However, OFDMA may have an increased peak to average power ratio (PAPR) compared to single carrier techniques. Higher order modulation schemes such as 256 QAM, 1024 QAM, or even 16KQAM may increase throughput but require error vector magnitude (EVM) performance that may further increase power consumption. In particular, a power amplifier may be most efficient when a working point is close to a non-linear part of a power output curve. When PAPR is high, the power amplifier may need a large backoff to operate effectively. With a lower PAPR, the power amplifier may use a lower backoff and operate in a more efficient region. Accordingly, reducing PAPR may reduce power consumption by improving efficiency of a power amplifier.

One technique for reducing PAPR for an ODFMA transmission is to clip peaks that exceed a threshold amplitude from samples of the signal prior to transmission and replace the peak amplitudes with set values. In an aspect, the clipped signal may be transmitted on a shared channel with a relatively high modulation scheme. The power amplifier may operate in an efficient region due to the reduced PAPR. A message (e.g., a peak suppression information message (PSIM)) including information describing the clipped peaks may be transmitted on a different channel using a relatively lower modulation scheme. The receiver may receive both the shared channel including the clipped signal and the PSIM. The receiver may reconstruct the original signal based on the clipped signal and the PSIM. The receiver may then decode the reconstructed signal. PSIM transmissions may be utilized in either downlink or uplink direction.

For downlink transmissions, a base station may use frequency division multiplexing (FDM) to transmit on a physical downlink shared channel (PDSCH) to multiple UEs. Because the PSIM may be derived from a time domain signal, the PSIM may be applicable to all of the UEs. Each UE, however, may experience different channel conditions and the PDSCH for each UE may use a different modulation and coding scheme (MCS). The MCS may be selected to achieve a desired error rate based on channel conditions. The MCS for the PSIM may be selected to be lower than a MCS for the UE. In the case of multiple UEs, encoding the PSIM with a MCS based on a lowest MCS for the PDSCH may result in a relatively large PSIM.

In an aspect, the present disclosure provides for an incremental PSIM that may be encoded with different MCSs to be decoded by the multiple UEs. A UE with a lowest MCS for the PDSCH may decode only a first portion of the incremental PSIM, whereas a UE with a highest MCS for the PDSCH may decode the entire incremental PSIM. Each UE may extract an amount of peak information from the incremental PSIM that is sufficient to raise an effective SNR for the PDSCH to a level that the UE may decode the PDSCH with the corresponding MCS. Accordingly, the incremental PSIM may improve spectral efficiency of a PSIM by encoding portions with incrementally higher MCS.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

In an aspect, as illustrated, one or more of the UEs 104 may include a PSIM receive (Rx) component 140 that receives an incremental PSIM including a plurality of PSIMs and decodes one or more of the incremental PSIMs to decode a data channel. The PSIM Rx component 140 may include a receiver 141 that receives one or more DCIs indicating the data channel for the UE 104, a MCS for the UE 104, and at least a first incremental PSIM for the data channel; a PSIM decoder 142 that decodes at least the first incremental PSIM; an incremental decoder 143 that determines whether to decode one or more subsequent incremental PSIMs based on the MCS for the UE; a reconstruction component 144 that applies peak information from the first incremental PSIM and any decoded subsequent incremental PSIMs to the data channel; and a data decoder 145 that decodes the data channel based on the MCS for the UE. The receiver 141 may also receive the data channel and the incremental PSIM.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

In an aspect, as illustrated, one or more of the base stations 102 may include a PSIM transmit (Tx) component 198 that transmits an incremental PSIM. As illustrated in further detail in FIG. 8, the PSIM Tx component 198 may include a signal generator 840 that generates a data channel including a transport block for each of two or more UEs 104; a clipping component 842 that performs peak suppression on the data channel to generate a clipped data channel signal and clipped peak information; a PSIM generator 844 that assigns to each UE 104, a portion of the clipped peak information based on the MCS for the respective UE 104; a PSIM encoder 846 that encodes the clipped peak information into a plurality of incremental PSIMs, each incremental PSIM including the portion of the clipped peak information assigned to a respective UE and encoded based on a MCS lower than the MCS for the respective UE; and a transmitter component 852 that transmits a respective DCI for each UE indicating the MCS for the respective UE and the respective data channel transport block for the respective UE. The transmitter component 852 may also transmit the plurality of incremental PSIMs and the respective data channel transport blocks.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies including future 6G technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The sub-carrier spacing and symbol length/duration are a function of the numerology. The subcarrier spacing may be equal to $2^\mu*15$ kHz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=2 with 4 slots per subframe. The slot duration is 0.25 ms, the subcarrier spacing is 60 kHz, and the symbol duration is approximately 16.67 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
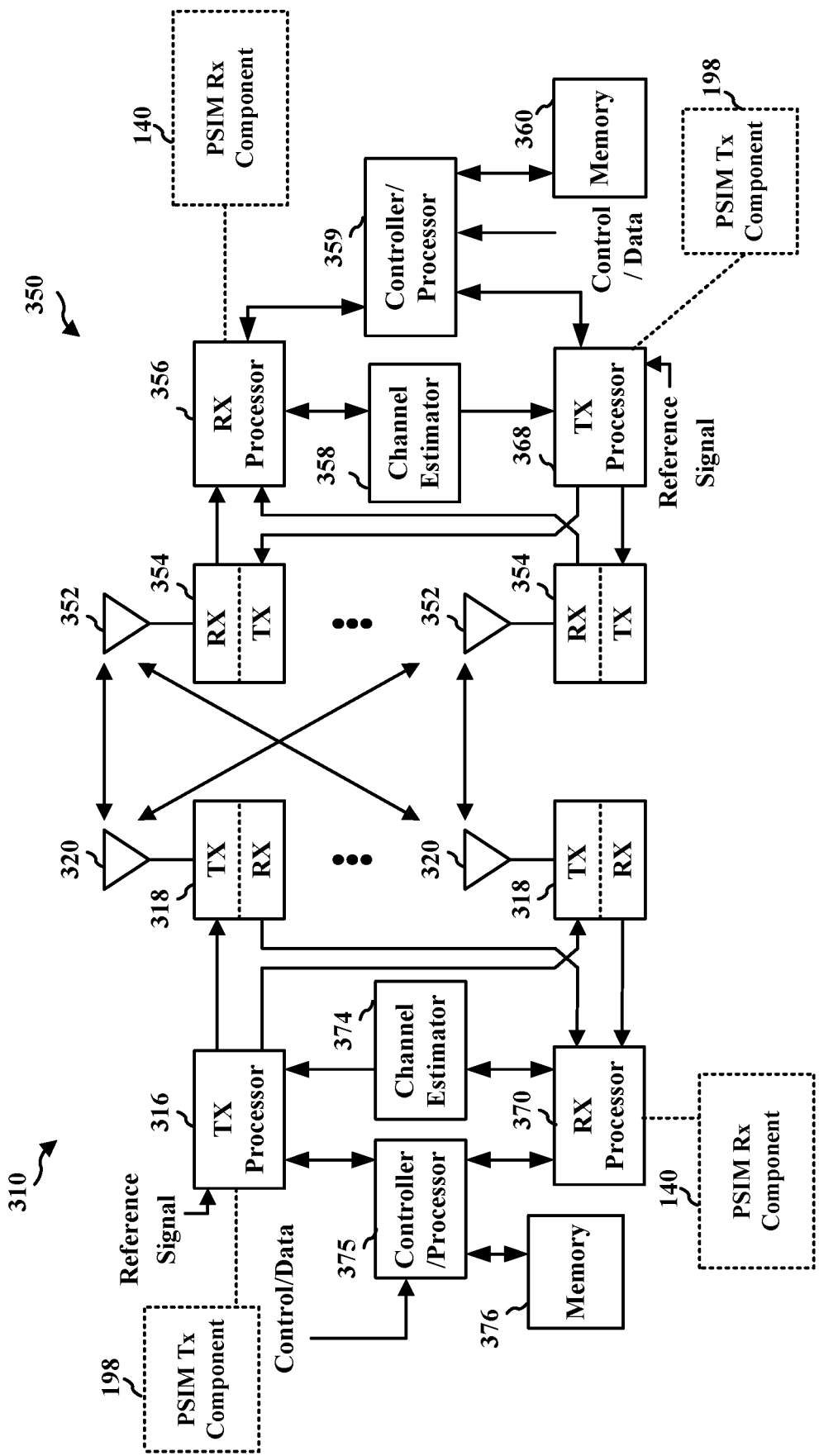
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the PSIM Tx component 198 or the PSIM Rx component 140 of FIG. 1.

At least one of the TX processor 316, the RX processor 370, and the controller/processor 375 may be configured to perform aspects in connection with the PSIM Tx component 198 or the PSIM Rx component 140 of FIG. 1.

Figure 4B:
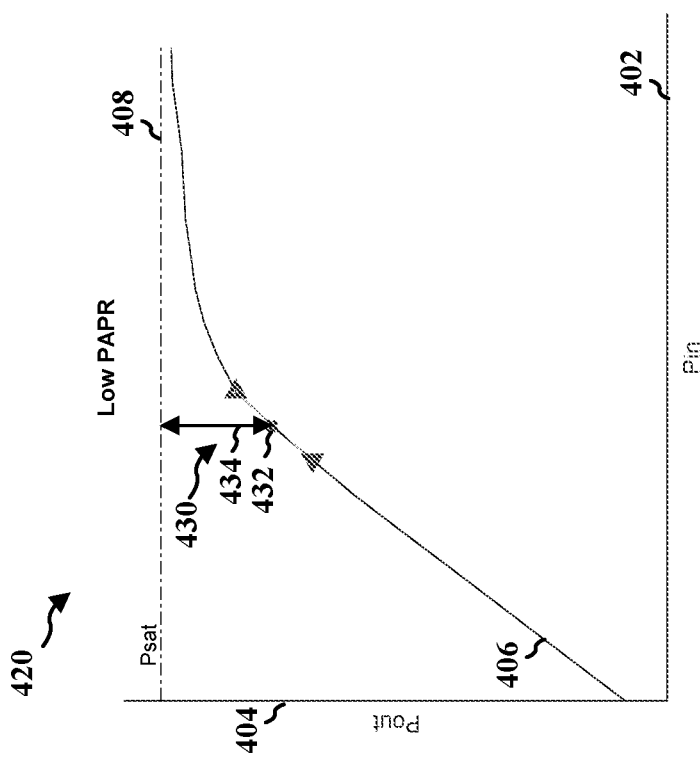
FIGS. 4A and 4B are diagrams illustrating example power amplifier operation based on peak to average power ratio (PAPR).
Figure 4A:
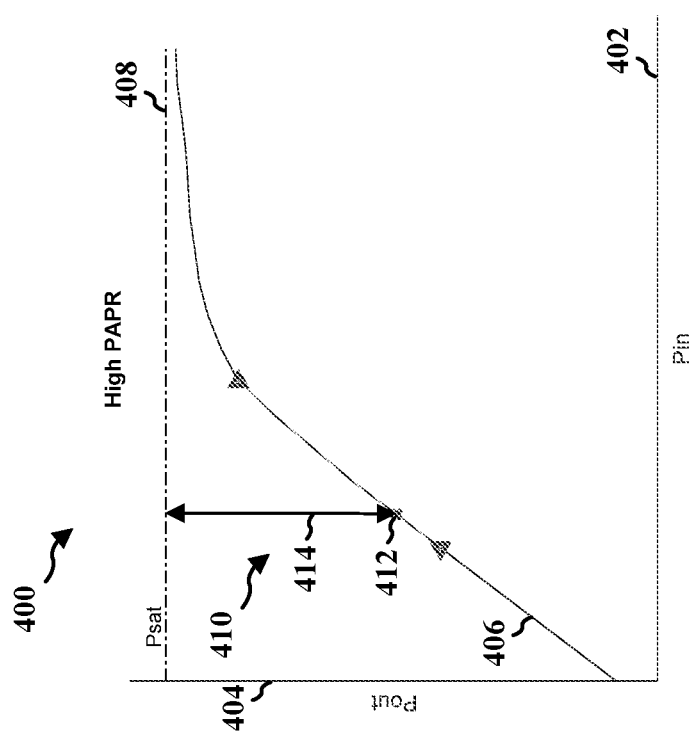

FIG. 4A is a diagram 400 of operation of a power amplifier. The power amplifier may receive a power in (Pin) 402 and produce a power out (Pout) 404 according to a curve 406. The power amplifier may have a power saturation (Psat) level 408 and the curve 406 may enter a non-linear portion as the curve 406 approaches the Psat level 408. For a signal with a high PAPR (e.g., greater than 6 dB), the power amplifier may operate over an operating range 410 including a working point 412 based on a backoff 414. In order to maximize the efficiency of the power amplifier (e.g., $\mu$=Pout/Pin), the working point 412 may be as close as possible to the non-linear part of the curve 406. Due to the high PAPR, a large backoff 414 may be taken to have good EVM for high constellations of high modulation schemes.

FIG. 4B is a diagram 420 of operation of the same power amplifier as FIG. 4A operating with a lower PAPR (e.g., less than 6 dB). The Pin 402, Pout 404, curve 406, and Psat level 408 may be the same as in FIG. 4A. Due to the lower PAPR, a backoff 434 may be smaller than the backoff 414. Accordingly, the operating range 430 may be smaller than the operating range 410 and the working point 432 may be set at a point with a greater power efficiency than shown in FIG. 4A. Accordingly, power consumption may be reduced without reaching the non-linear part of the curve and compromising EVM.

Figure 5:
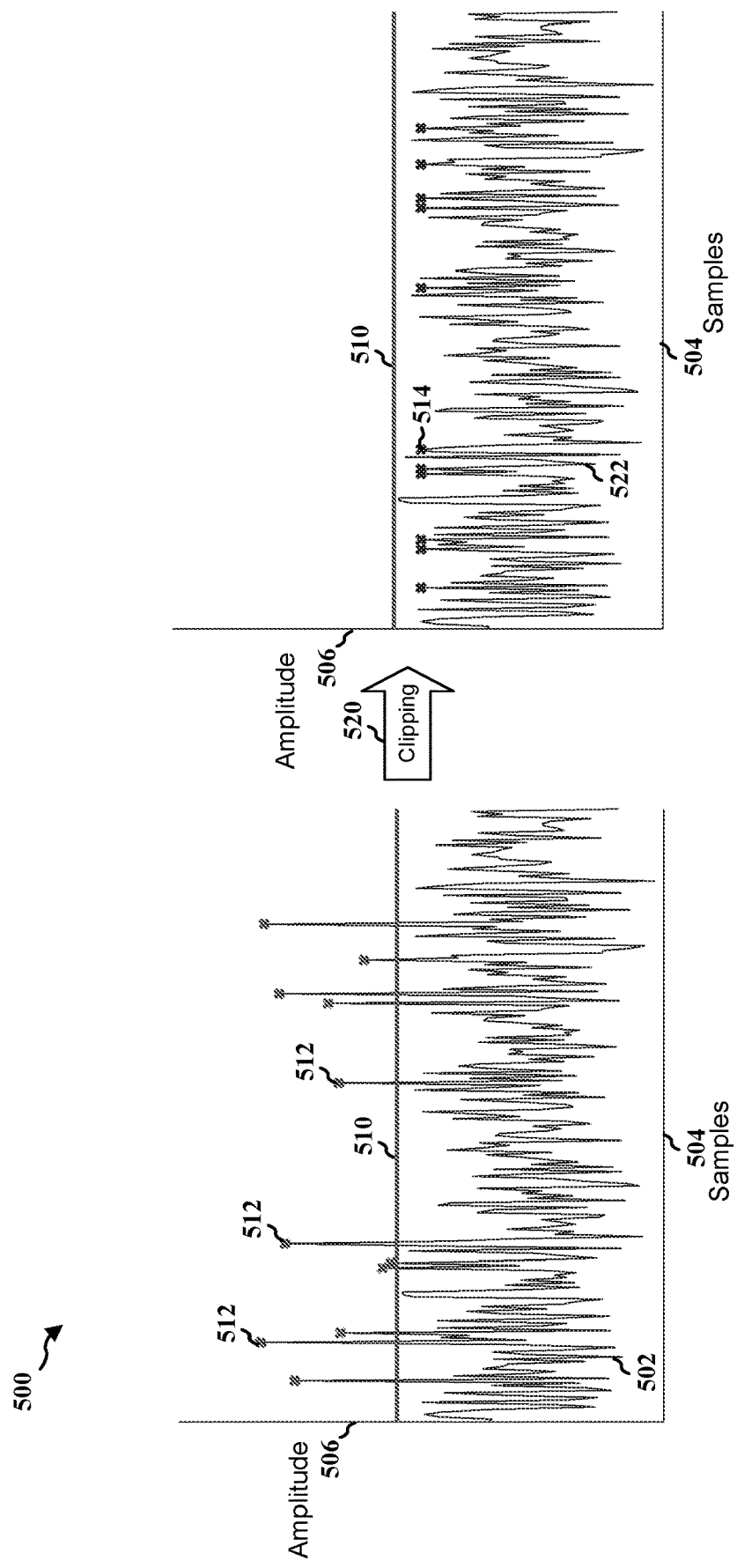
FIG. 5 is a diagram illustrating an example operation for clipping samples of a signal for PAPR reduction.

FIG. 5 is a diagram 500 illustrating a clipping operation 520. A signal 502 may include a plurality of samples 504. Each sample may have an amplitude 506 and a phase (not shown). The power amplifier may amplify the signal 502 based on a target transmission power of a sub-carrier based on the amplitude 506 of the signal 502. In a clipping operation, peaks 512 that have an amplitude that exceeds a threshold power level 510 may be clipped to generate a clipped signal 522. The samples 504 with the peaks 512 may have the amplitude 506 set to a value 514 that is less than the threshold power level 510. The clipping operation 520 reduces the PAPR by eliminating the peaks 512 that are above the threshold power level 510 such that the new peak amplitude values are closer to the average than the peaks 512. In an aspect, the clipping operation 520 may increase the EVM of the clipped signal 522 due to the removed information. Accordingly, the clipping operation 520 may reduce the likelihood that the clipped signal 522 will be decoded correctly by a receiver. A PSIM may include information about the peaks 512 such that the signal 502 may be reconstructed based on the clipped signal 522 and the PSIM. The reconstructed signal may have improved likelihood of correct decoding compared to the clipped signal 522.

Figure 6:
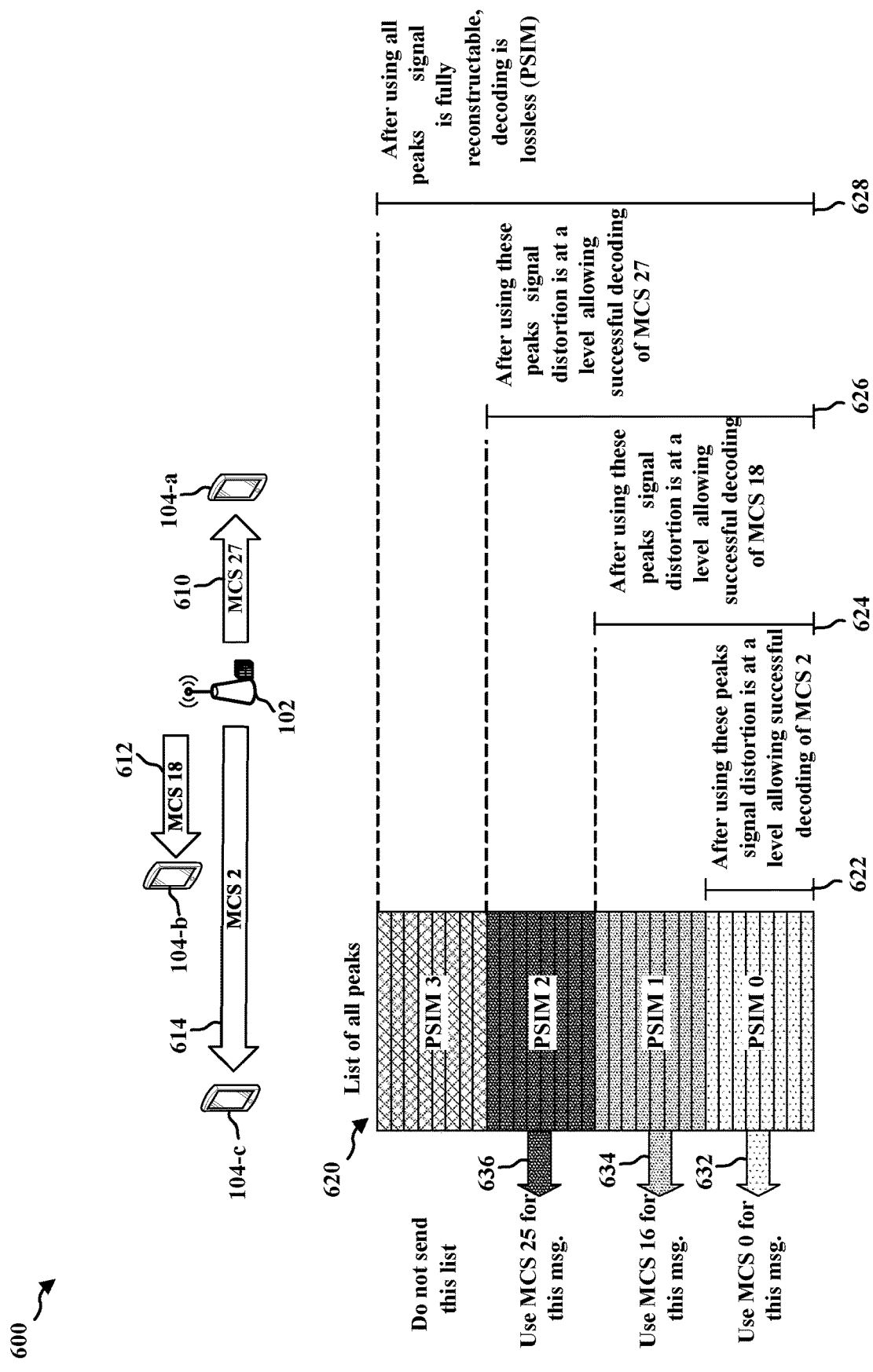
FIG. 6 is a diagram illustrating example assignment of peak information based on modulation and coding scheme (MCS).

FIG. 6 is a diagram 600 illustrating example assignment of peak information based on MCS. A base station 102 may serve multiple UEs 104. For example, as illustrated, the multiple UEs 104 include UE 104-*a*, UE 104-*b*, and UE 104-*c*. Each UE 104 may experience different channel conditions. The base station 102 may determine channel conditions, for example, by measuring a reference signal transmitted by each of the UEs 104. The base station 102 may determine an MCS for a data channel (e.g., PDSCH) for each UE 104 based, at least in part, on the channel conditions. The MCS may also depend on an amount of downlink data and available resources. For example, the MCS of PDSCH 610 for UE 104-*a* may be 27, the MCS of PDSCH 612 for UE 104-*b* may be 18, and the MCS of PDSCH 614 for the UE 104-*c* may be 2. The number of the MCS may refer to an index in a ranked listing of MCS. For example, 3GPP TS 38.214 defines MCS indices in increasing order of spectral efficiency. Accordingly, a PDSCH with MCS of 27 may have a higher spectral efficiency and carry more data per resource element than a PDSCH with MCS of 2. The base station 102 may assign the MCS and resources to each of PDSCH 610, 612, and 614. The base station 102 may use frequency domain multiplexing (FDM) to transmit the PDSCH 610, 612, and 614 over a carrier.

As discussed with respect to FIG. 5, PAPR reduction using PSIM may include clipping peaks 512 from a signal before transmission. For example, the base station 102 may clip the peaks 512 from the FDM signal including PDSCH 610, 612, and 614. The base station 102 may determine a list of all peaks 620 based on the clipped peaks 512. For example, the list of all peaks 620 may be arranged in order based on amplitude. Generally, when reconstructing the original signal, adding the peaks with the greatest amplitude may provide the greatest increase in signal quality or greatest reduction in error vector magnitude (EVM).

The base station 102 may generate an incremental PSIM by assigning each UE a number of peaks based on the MCS for the UE. In the illustrated example, the UE 104-*c* may be assigned group 622 including the highest amplitude peaks, the UE 104-*b* may be assigned group 624, and the UE 104-*a* may be assigned group 626. A last group 628 may not be assigned to any UE because some level or EVM may be allowed. The base station 102 may generate incremental PSIMs 632, 634, 636 based on the corresponding groups 622, 624, 626. As discussed in further detail below, each UE 104 may decode the first incremental PSIM 632 and any subsequent PSIM (e.g., incremental PSIM 634, 636) having an MCS lower than the MCS for the UE 104. For example, the UE 104-*c* may only decode the first incremental PSIM 632 encoded with an MCS of 0. After using the peaks of the first incremental PSIM 632, signal distortion may be at a level allowing decoding of MCS 2, so the UE 104-*c* may decode the PDSCH 614. As another example, the MCS of PDSCH 612 for UE 104-*b* may be 18, so the UE 104-*b* may decode the second incremental PSIM 634. After using the peaks in group 624, the signal distortion is at a level allowing decoding of MCS 18, so the UE 104-*b* may decode the PDSCH 612. As a third example, the MCS of PDSCH 610 for UE 104-*a* may be 27, so the UE 104a may decode the third incremental PSIM 636. After using the peaks in group 626, the signal distortion is at a level allowing successful decoding of MCS 27, so the UE 104-*a* may decode the PDSCH 610.

Figure 7:
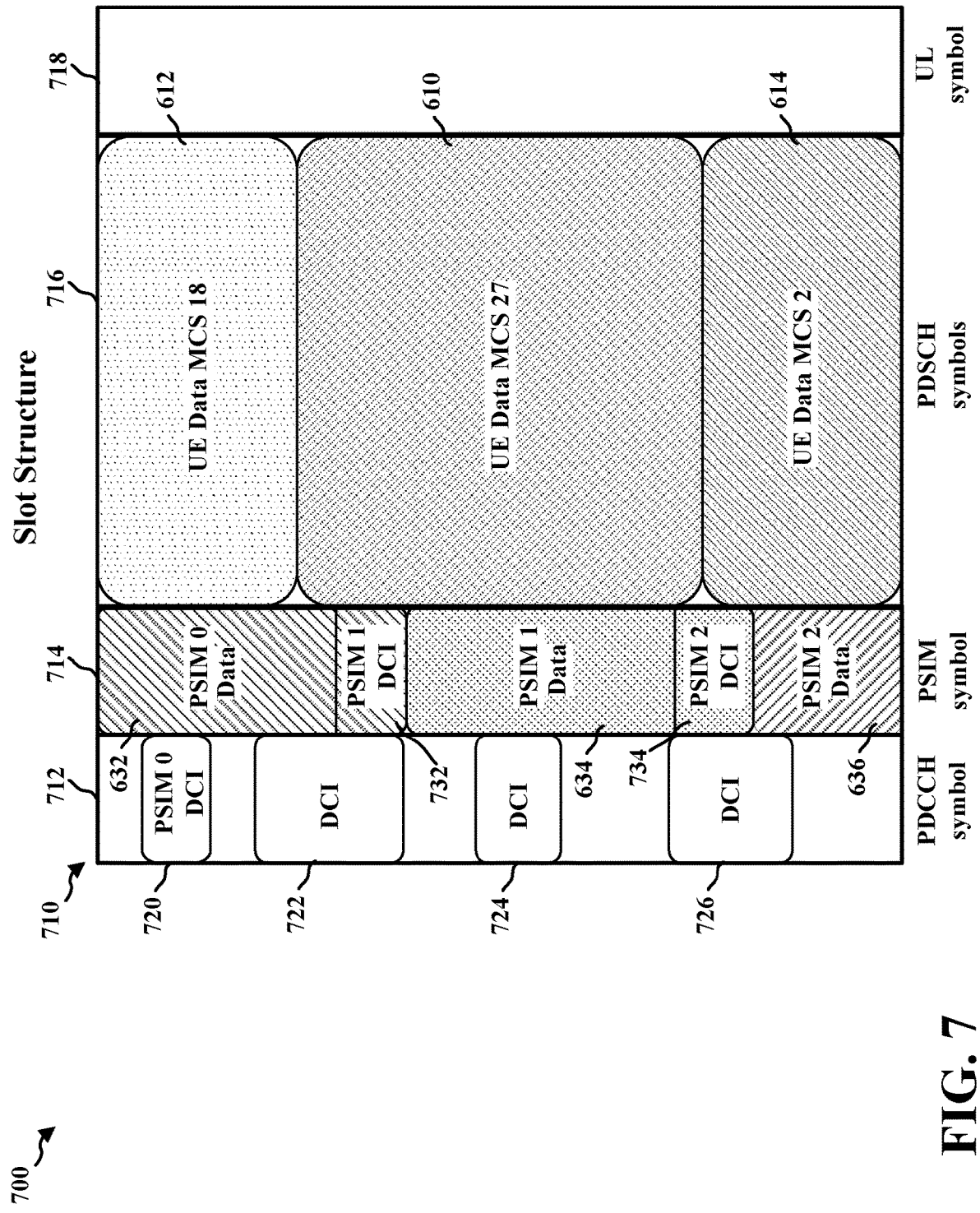
FIG. 7 is a diagram illustrating an example slot structure for an incremental peak suppression information message (PSIM).

FIG. 7 is a diagram illustrating an example slot structure 700 for incremental PSIMs. The slot structure 700 may correspond to a frame structure such as the frame structure described above with respect to FIG. 2A. A first symbol 712 of a slot 710 may be a PDCCH symbol that may carry one or more DCIs. For example, the first symbol 712 may carry a PSIM 0 DCI 720, a DCI 722 for UE 104-*a*, a DCI 724 for UE 104-*b*, and a DCI 726 for UE 104-*c*. The PSIM 0 DCI 720 may provide information about the first incremental PSIM 632. For example, the PSIM 0 DCI 720 may indicate resources and an MCS of the first incremental PSIM 632. In an aspect, the PSIM 0 DCI 720 may have a CRC scrambled with a radio network temporary identifier (RNTI) for PSIMs that is common for all UEs. The DCI 722 for UE 104-*a*, the DCI 724 for UE 104-*b*, and the DCI 726 for UE 104-*c* may indicate the resources and the MCS of a respective PSDCH for each UE 104. Each of the DCI 722 for UE 104-*a*, the DCI 724 for UE 104-*b*, and the DCI 726 for UE 104-*c* may include a CRC scrambled with a RNTI of the respective UE 104. In some implementations, the DCI 722 for UE 104-*a*, the DCI 724 for UE 104-*b*, and the DCI 726 for UE 104-*c* may point to the PSIM 0 DCI 720.

The second symbol 714 of the slot 710 may be a PSIM symbol carrying the incremental PSIMs. The first incremental PSIM 632 may be decodable by each of the UEs 104 and include peaks in the first group 622. The first incremental PSIM 632 may also include a PSIM 1 DCI 732 indicating the MCS and resources for a subsequent incremental PSIM (e.g. the second incremental PSIM 634). Each of the UEs 104 may determine whether to decode the second incremental PSIM 634 based on the MCS indicated in the respective DCI 722, 724, 724 for the UE. For example, UEs 104-*a* and 104-*b* may decode the second incremental PSIM 634 to obtain the peaks in group 624. Similar to the first incremental PSIM 632, the second incremental PSIM 634 may include a PSIM 2 DCI 734 for the third PSIM 736. Each of the UEs 104 may determine whether to decode the third incremental PSIM 636 based on the MCS indicated in the respective DCI 722, 724, 724 for the UE. For example, UEs 104-*a* may decode the third incremental PSIM 636 to obtain the peaks in group 626. Accordingly, each UE may decode one or more of the incremental PSIMs 632, 634, 636 to obtain the assigned peaks.

The symbols 716 may include one or more symbols carrying the PDSCHs 610, 612, and 614 for the UEs 104. Each UE 104 may decode a respective PDSCH based on the DCI 722, 724, 726 for the UE 104. A symbol 718 may be an uplink symbol, which may be used to carry an acknowledgment of the PDSCH, or other uplink information.

Figure 8:
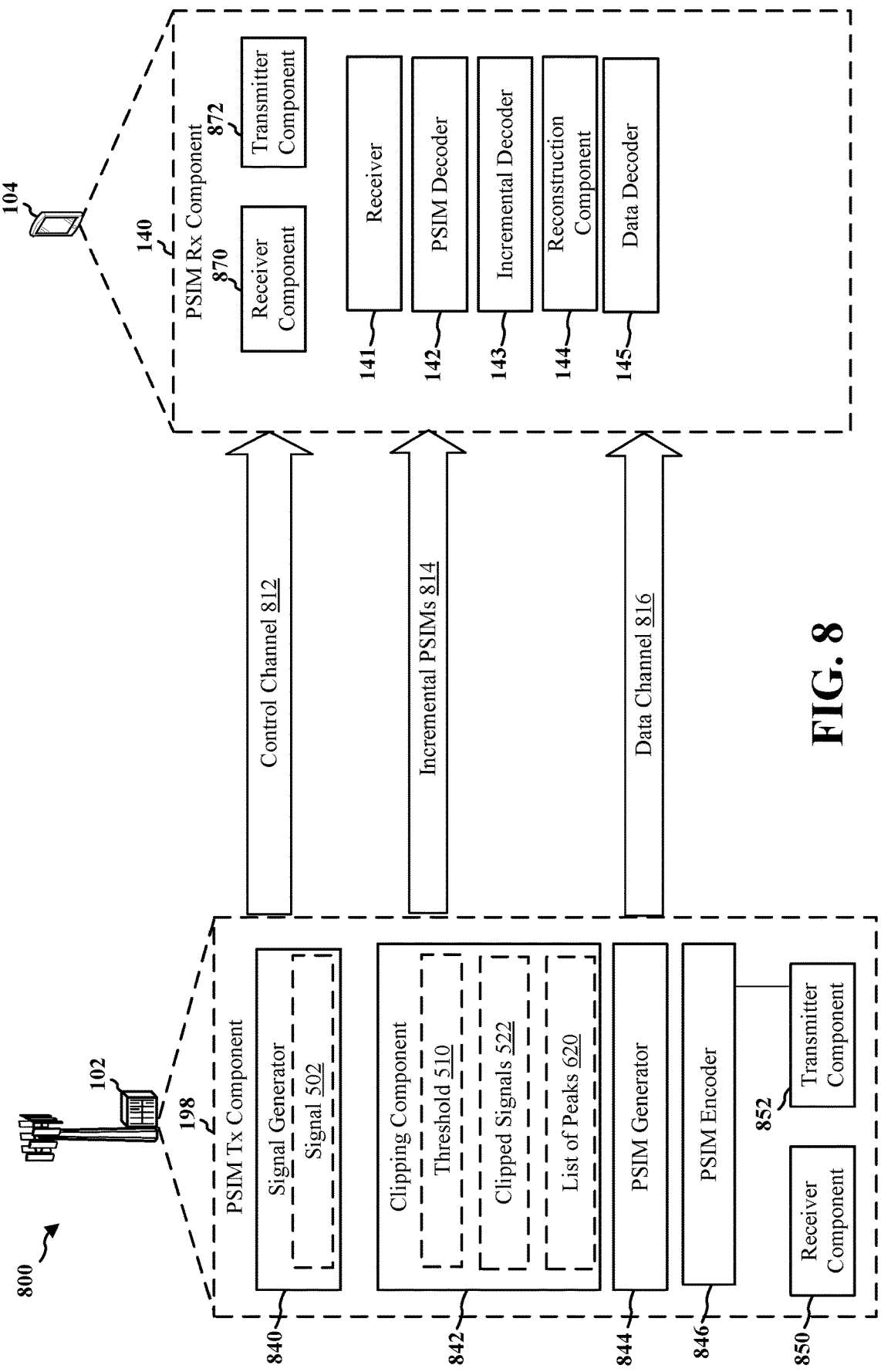
FIG. 8 is a diagram illustrating example communications and components of a base station and a UE.

FIG. 8 is a diagram 800 illustrating example communications and components of a base station 102 and a UE 104. The UE 104 may include the PSIM Rx component 140. The base station 102 may include the PSIM Tx component 198.

As discussed above regarding FIG. 1, PSIM Rx component 140 may include the receiver 141, the PSIM decoder 142, the incremental decoder 143, the reconstruction component 144, and the data decoder 145. The PSIM Rx component 140 may also include a receiver component 870 and a transmitter component 872. The receiver component 870 may include, for example, a RF receiver for receiving the signals described herein. The transmitter component 872 may include for example, an RF transmitter for transmitting the signals described herein. In an aspect, the receiver component 870 and the transmitter component 872 may be co-located in a transceiver.

The PSIM Tx component 198 may include the signal generator 840, the clipping component 842, the PSIM generator 844, and the PSIM encoder 846. The PSIM Tx component 198 may also include a receiver component 850 and a transmitter component 852. The receiver component 850 may include, for example, a RF receiver for receiving the signals described herein. The transmitter component 852 may include for example, an RF transmitter for transmitting the signals described herein. In an aspect, the receiver component 850 and the transmitter component 852 may be co-located in a transceiver.

The PSIM Tx component 198 may transmit a control channel 812 that schedules a transmission utilizing peak suppression and includes incremental PSIMs 814 and a data channel 816. The control channel 812 may be, for example, a PDCCH transmitted on the PDCCH symbol 712. The control channel 812 may carry one or more DCIs indicating the data channel 816 for each UE and the incremental PSIMs 814 for the data channel 816. The data channel 816 may be, for example, a physical downlink shared channel (PDSCH) transmitted on the PDSCH symbols 716.

The signal generator 840 may generate respective data channel transport blocks for each of two or more UEs. Each transport block may be associated with a MCS for a respective UE. The signal generator 840 may perform processing described above with respect to the TX processor 316. The signal generator 840 may, for example, determine physical resources for the data channel 816. The signal generator 840 may determine a transport block size for each component carrier based on the physical resources and a MCS selected based on channel conditions. The signal generator 840 may obtain transmission data from a queue and encode the transmission data to generate transport blocks of the determined size for each UE. The signal generator 840 may further map the encoded bits of the transport blocks to modulation symbols. For MIMO transmissions, the signal generator 840 may multiply the data from different layers by a precoding matrix. The signal generator 840 may perform an IFFT on the data to generate a signal 502 for transmission on the data channel 816.

The clipping component 842 may perform peak suppression on the data channel to generate a clipped data channel signal and clipped peak information. For example, the clipping component 842 may perform the clipping operation 520 on the signal 502 to generate the clipped signal 422. The clipping component 842 may clip samples 504 having an amplitude 506 greater than the threshold power level 510. The clipping component 842 may set the amplitude 506 for the samples 504 to the set value 514. The clipping component 842 may also generate the list of peaks 620 including clipped sample information describing the peaks 512. The list of peaks 620 may include a peak position, amplitude, and/or phase. In an aspect, the threshold power level 510 may be selected based on a size of the resources for PSIM. The greater the threshold power level 510, the fewer peaks 512 above the threshold power level 510 and the smaller the size of the list of peaks 620. In another aspect, the threshold power level 510 may be selected based on a target PAPR. In an aspect, the list of peaks 620 may indicate the threshold power level 510 and/or the set value 514.

The PSIM generator 844 may assign to each UE 104 a portion of the clipped peak information (e.g., list of peaks 620) based on the MCS for the respective UE. For example, an amount of clipped peak information assigned to each UE may be based on the MCS and a SNR for the UE. The amount of clipped peak information for a UE may be sufficient to raise an expected SNR of the respective data channel transport block to a level sufficient to decode the respective data channel transport block based on the MCS for the respective UE.

The PSIM encoder 846 may encode the clipped peak information into a plurality of incremental PSIMs 632, 634, 636. Each incremental PSIM 632, 634, 636 may include the portion of the clipped peak information in the group 622, 624, 626, assigned to a respective UE 104-*a*, 104-*b*, 104-*c*. In an aspect, the PSIM encoder 846 may compress the clipped sample info in each group 622, 624, 626. The clipped sample info may not be a random Gaussian signal, so the compression may be based on a pattern of the clipped sample info. For example, the PSIM encoder 846 may utilize wavelet compression. In another example, the position of the peak per antenna may be used to represent the clipped sample info as a dynamic, variable length, or differential representation. The phase of the clipped sample info may not be transmitted because the clipped signals 522 may still include the phase information for each sample. In an aspect, a polar amplitude representation may represent the amplitudes as a small number of bits due to a small dynamic range (e.g., above the threshold power level 510) or a differential to a maximum peak 512. In another aspect, analog coding may be used. In another aspect, the peak position vector may be limited to a number of known options. The receiver may perform blind detection on the peak position vector out of the number of known options. Accordingly, the clipped sample info may be compressed to a size less than or equal to the resources for transmitting the incremental PSIM. In an aspect, the resources for the incremental PSIM may be a single dedicated symbol (e.g., PSIM symbol 714). The PSIM encoder 846 may encode the clipped peak information based on a MCS lower than the MCS for the respective UE. The PSIM encoder 846 may order the plurality of incremental PSIMs in order of MCS from lowest to highest. Accordingly, the first incremental PSIM 632 may be encoded with an MCS lower than the lowest MCS of the UEs 104 and the last incremental PSIM 636 may be encoded with an MCS lower than the highest MCS of the UEs 104.

The transmitter component 852 may transmit the respective data channel transport blocks, the plurality of incremental PSIMs, and a respective DCI for each UE indicating the MCS for the respective UE and the respective data channel transport block for the respective UE. For example, the transmitter component 852 may transmit the respective data channel transport blocks as PDSCHs 610, 612, and 614 on the PDSCH symbols 716. The transmitter component 852 may transmit the incremental PSIMs 814 (e.g., including incremental PSIMs 632, 634, 636) on the PSIM symbol 714. The transmitter component 852 may transmit the DCIs 722, 724, 726 for each of the UEs 104 on the PDCCH symbol 712, for example, using a UE-specific RNTI. The transmitter component 852 may transmit the PSIM 0 DCI 720 on the PDCCH symbol 712 using a common RNTI.

The receiver 141 may perform baseband processing on signals received via the receiver component 870. For example, the receiver 141 may receive one or more DCIs indicating a data channel (e.g., PDSCH) for the UE 104, a MCS for the UE 104, and at least a first incremental PSIM for the data channel. In an aspect, the receiver 141 may perform signal processing as described above with respect to the RX processor 356. For example, the receiver 141 may perform a fast Fourier transform (FFT), channel estimation, and equalization. The receiver 141 may perform blind decoding on the control channel 812 to detect DCIs having a CRC scrambled with a RNTI of the UE. The receiver 141 may also receive the incremental PSIM and the data channel 816.

The PSIM decoder 142 may decode at least the first incremental PSIM 632. The first incremental PSIM 632 may be applicable to a MCS lower than or equal to the MCS for the UE. The first incremental PSIM 632 may be encoded with an MCS lower than the MCS to which it is applicable. The first incremental PSIM 632 may include peak information for the first group 622 of clipped peaks. In an aspect, the PSIM decoder 142 may decompress the decoded PSIM channel, for example, using the inverse of the techniques described above regarding compression. In an aspect, the first incremental PSIM 632 may include a PSIM DCI 732 for a subsequent incremental PSIM 634. The PSIM DCI 732 may be similar to the PSIM 0 DCI 720 and indicate resources for the subsequent incremental PSIM 634, a MCS of the subsequent incremental PSIM 634, and a data MCS to which the subsequent incremental PSIM 634 is applicable. The resources for the subsequent incremental PSIM may be indicated by a start location and a length.

The incremental decoder 143 may determine whether to decode one or more subsequent incremental PSIMs based on the MCS for the UE and the data MCS to which the subsequent incremental PSIM is applicable. For example, the incremental decoder 143 may determine to decode the subsequent incremental PSIM 634 when the data MCS for the next incremental PSIM is lower than or equal to the MCS for the UE. The incremental decoder 143 may provide an indication to the PSIM decoder 142 to decode the subsequent incremental PSIM 634.

The reconstruction component 144 may apply the peak information from the first incremental PSIM 632 and any decoded subsequent incremental PSIMs 634, 636 to the data channel 816. The reconstruction component 144 may at least partially reconstruct the signal 502 for based on the received data channel 816 and the peak information. For example, the reconstruction component 144 may determine the clipped peak information for a plurality of clipped peaks 512 based on the decoded first incremental PSIM 632 and any decoded subsequent incremental PSIMs 634, 636. The reconstruction component 144 may transform the plurality of clipped peaks to a frequency domain signal (e.g., by performing an FFT). The reconstruction component 144 may add the frequency domain signal to the data channel 816.

The data decoder 145 may decode the data channel 816 based on the MCS for the UE. For example, the data decoder 145 may decode the at least partially reconstructed original signal 502. For example, the data decoder 145 may perform demodulation and decoding as described above with respect to the receive processor 356.

Figure 9:
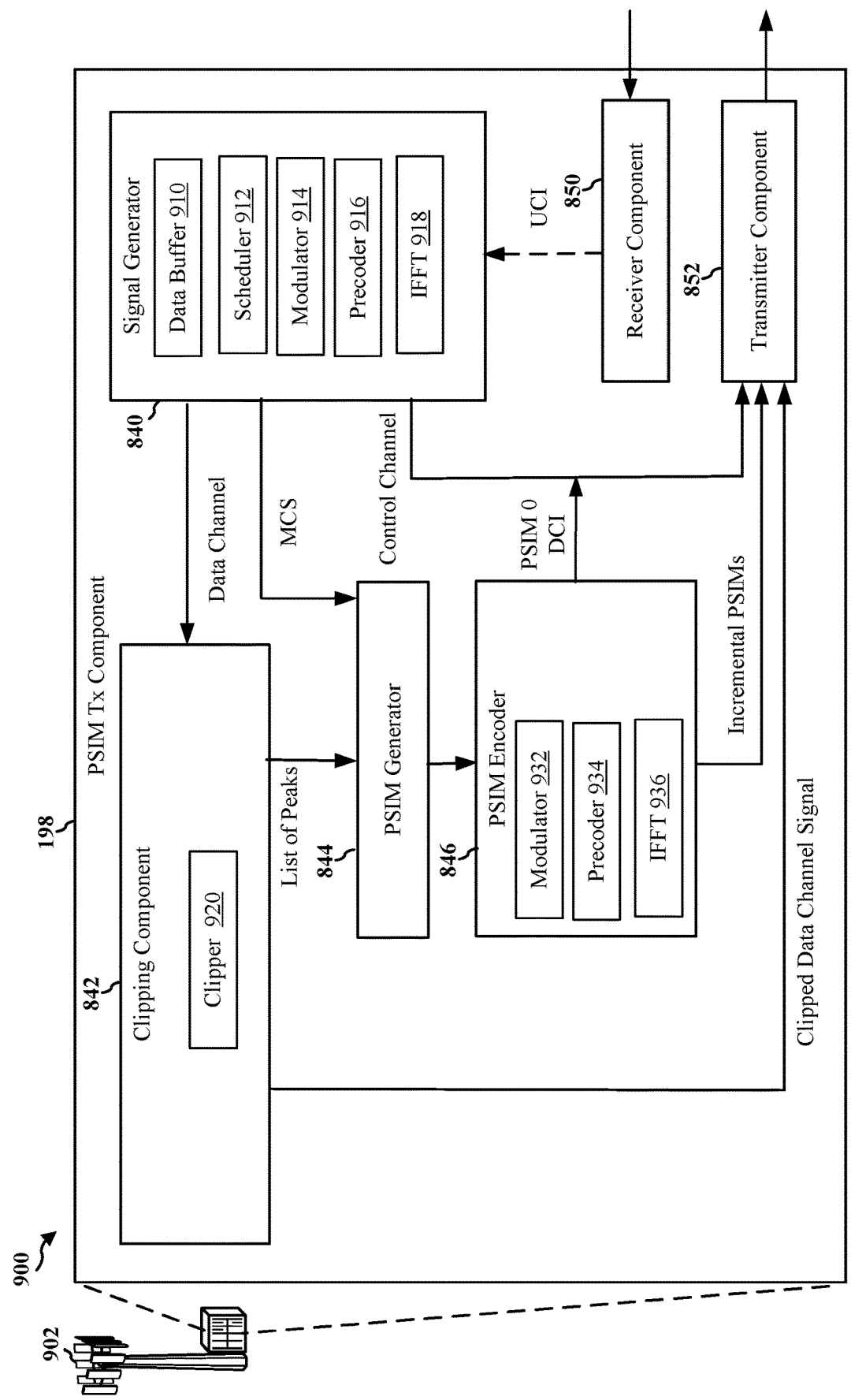
FIG. 9 is a conceptual data flow diagram illustrating the data flow between different means/components in an example transmitting device.

FIG. 9 is a conceptual data flow diagram 900 illustrating the data flow between different means/components in an example base station 902, which may be an example of the base station 102 including the PSIM Tx component 198.

The signal generator 840 may obtain data from a data buffer 910 for two or more UEs. The signal generator 840 may include a scheduler 912 that allocates resources and determines a transport block size and MCS for each UE. For example, the receiver component 850 may receive uplink control information (UCI) and provide the UCI to the signal generator 840 for use in scheduling transmissions. The signal generator 840 may include a modulator 914 that maps the data from the data buffer 910 to modulation symbols according to the transport block size and MCS. The signal generator 840 may include a precoder 916 that applies a precoding matrix to the modulation symbols and an inverse fast Fourier transform (IFFT) 918 that produces a physical channel signal for the data channel 816. The signal generator 840 may provide the data channel 816 to the clipping component 842. The signal generator 840 may also generate the control channel 812 carrying DCIs 722, 724, and 726. The signal generator 840 may provide the MCS for each transport block to the PSIM generator 844.

The clipping component 842 may receive the data channel from the signal generator 840. performing peak suppression on the data channel to generate a clipped data channel signal and clipped peak information The clipping component 842 may include a clipper 920 that performs the clipping operation 520 by comparing an amplitude of each sample of the physical channel signal to the threshold power level 510. The clipper 920 may detect peaks 512 and set the amplitude of such peaks to the set value 514. The clipper 920 may generate the clipped signal 522. The clipper 920 may also generate the list of clipped peaks 620 including clipped sample information. The clipping component 842 may provide the clipped signal to the transmitter component 852 and provide the list of peaks 620 to the PSIM generator 844.

The PSIM generator 844 may receive the list of peaks 620 from the clipping component 842 and the MCS from the signal generator 840. The PSIM generator 844 may determine the groups 622, 624, 626, and 628 based on the MCS for each UE. The PSIM generator 844 may provide the groups 622, 624, and 626 to the PSIM encoder 846. The last group 628 may be omitted because some EVM may be tolerated.

The PSIM encoder 846 may receive the groups 622, 624, and 626 from the PSIM generator 844. The PSIM encoder 846 may encode each group 622, 624, 626 as an incremental PSIM 632, 634, 636. The PSIM encoder 846 may also generate the PSIM DCIs 720, 732, 734. The PSIM encoder 846 may encode the first PSIM 0 DCI 720 separately for transmission on the control channel 812. The PSIM encoder 846 may encode the subsequent PSIM DCIs 732, 734 within a respective preceding incremental PSIM 632, 634, as illustrated in FIG. 7. The PSIM encoder 846 may include a modulator 932 that modulates the modulation symbols, a precoder 934 that applies a precoding matrix, and an IFFT 936 that produces a physical channel signal for transmission on the PSIM symbol 714. The PSIM encoder 846 may transmit the incremental PSIMs via the transmitter component 852.

Figure 10:
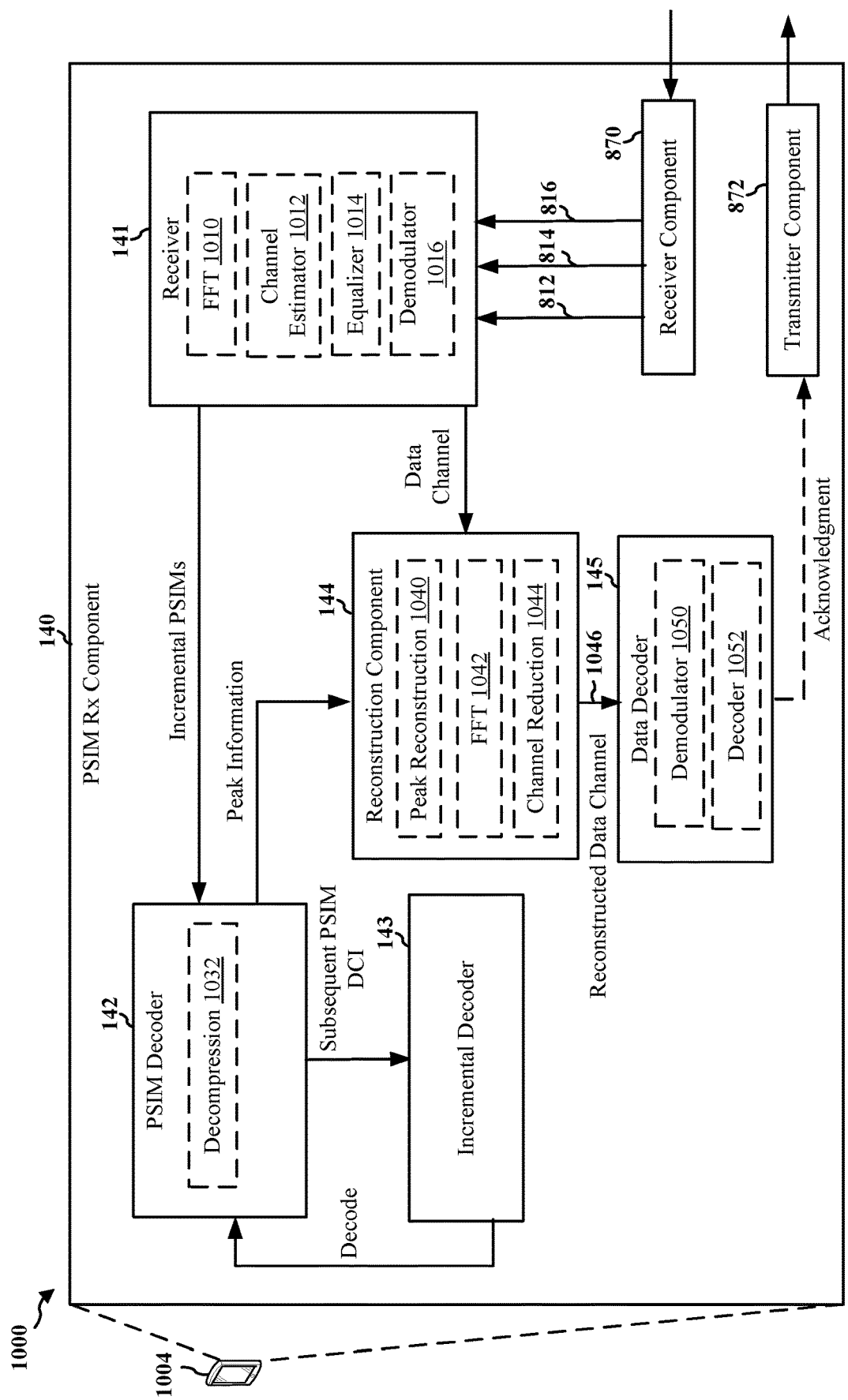
FIG. 10 is a conceptual data flow diagram illustrating the data flow between different means/components in an example receiving device.

FIG. 10 is a conceptual data flow diagram 1000 illustrating the data flow between different means/components in an example UE 1004, which may be an example of the UE 104 and include the PSIM Rx component 140. Alternatively, for uplink communications, the base station 102 may include the PSIM Rx component 140.

The receiver 141 may receive the control channel 812, the incremental PSIMs 814, and the data channel 816 via the receiver component 870. The receiver 141 may detect one or more DCI 720, 722, 724, 726 indicating the data channel 816 for the UE, a MCS for the UE, and at least a first incremental PSIM 632 for the data channel. For example, the DCI 722 may be a DCI for the UE 104 indicating the data channel 816 and the MCS, and the PSIM 0 DCI 720 may indicate the first incremental PSIM 632. For the data channel 816, the receiver 141 may perform an FFT 1010. The receiver 141 may include a channel estimator 1012 that estimates the channel (e.g., based on reference signals). The receiver 141 may include an equalizer 1014 that equalizes the received signal based on the channel estimate. The receiver 141 may include a channel expansion component that expands the channel to revert application of a precoding matrix. Accordingly, the receiver 141 may recover the clipped signal 522 from the data channel 816. The data receiver may provide the clipped signal 522 to the reconstruction component 144. The receiver 141 may provide the incremental PSIMs 814 and the MCS to the PSIM decoder 142. The receiver 141 may provide the data channel 816 to the reconstruction component 144.

The PSIM decoder 142 may receive the incremental PSIMs 814 from the receiver 141. The PSIM decoder 142 may decode at least the first incremental PSIM 632. The PSIM decoder 142 may include a decompression component 1032 to decompress the compressed clipped sample info and recover the peak information. The PSIM decoder 142 may provide the peak information to the reconstruction component 144. The PSIM decoder 142 may also decode the PSIM DCI 732, 734 for a subsequent incremental PSIM 634, 636. The PSIM decoder 142 may provide the PSIM DCI 732, 734 and the MCS for the UE 104 to the incremental decoder 143.

The incremental decoder 143 may determine whether to decode one or more subsequent incremental PSIMs 634, 636 based on the MCS for the UE. For example, the incremental decoder 143 may determine to decode a next incremental PSIM when a data MCS for the next incremental PSIM is lower than or equal to the MCS for the UE. The incremental decoder 143 may provide a decode signal to the PSIM decoder 142 indicating whether to decode a subsequent incremental PSIM.

The reconstruction component 144 may receive the data channel 816 from the receiver 141 and the peak information from the PSIM decoder 142. The reconstruction component 144 may apply the peak information from the first incremental PSIM 632 and any decoded subsequent incremental PSIMs 634, 636 to the data channel 816. For example, the reconstruction component 144 perform peak reconstruction 1040. For instance, the peak reconstruction 1040 may include determining the locations and amplitudes of the peaks 512. The reconstruction component 144 may perform FFT 1042 on the peaks and add the peaks to the clipped signal from the data receiver 141. The reconstruction component 144 may perform channel reduction 1044, for example, by multiplying by the combined signal by the precoding matrix. Accordingly, the reconstruction component 144 may generate a reconstructed data channel 1046 that may be an at least partially restored signal including some of the peaks clipped from original signal 502. The reconstruction component 144 may provide the reconstructed data channel to the data decoder 145.

The data decoder 145 may include a demodulator 1050 that performs demodulation according to the MCS of the data channel 816 to generate modulation symbols and assemble a transport block for the UE. The data decoder 145 may include a decoder 1052 that decodes the transport block to obtain the original data. In an aspect, the data decoder 145 may determine an acknowledgment of the transport block for transmission via the transmitter component 872.

Figure 11:
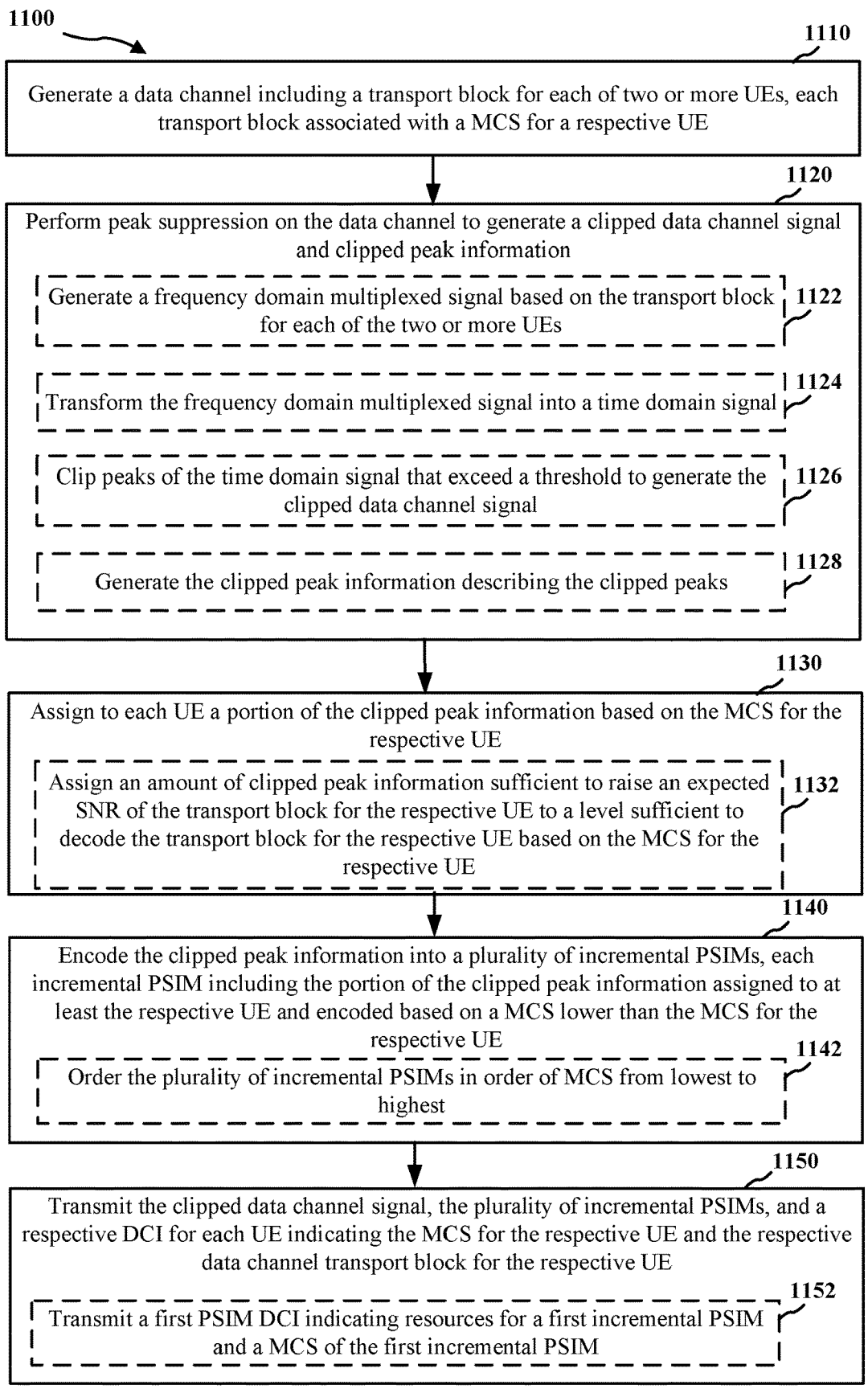
FIG. 11 is a flowchart of an example of a method of wireless communication for a transmitting device.

FIG. 11 is a flowchart of an example method 1100 for transmitting an incremental PSIM. The method 1100 may be performed by a base station (such as the base station 102, which may include the memory 376 and which may be the entire base station 102 or a component of the base station 102 such as the PSIM Tx component 198, TX processor 316, the RX processor 370, or the controller/processor 375). The method 1100 may be performed by the PSIM Tx component 198 in communication with the PSIM Rx component 140 of the UE 104.

At block 1110, the method 1100 may include generating a data channel including a transport block for each of two or more UEs, each transport block associated with a MCS for a respective UE. In an aspect, for example, the base station 102, the controller/processor 375, and/or the TX processor 316 may execute the PSIM Tx component 198 and/or the signal generator 840 to generate a data channel 816 including a transport block for each of two or more UEs (e.g., UEs 104-a, 104-b 104-c), each transport block associated with a MCS for a respective UE. Accordingly, the base station 102, the controller/processor 375, and/or the TX processor 316 executing the PSIM Tx component 198 and/or the signal generator 840 may provide means for generating a data channel including a transport block for each of two or more UEs, each transport block associated with a MCS for a respective UE.

At block 1120, the method 1100 may include performing peak suppression on the data channel to generate a clipped data channel signal and clipped peak information. In an aspect, for example, the base station 102, the controller/processor 375, and/or the TX processor 316 may execute the PSIM Tx component 198 and/or the clipping component 842 to performing peak suppression on the data channel to generate a clipped data channel signal and clipped peak information. For example, at sub-block 1122, the block 1120 may optionally include generating a frequency domain signal based on the data channel transport blocks. At sub-block 1124, the block 1120 may optionally include transforming the frequency domain signal into a time domain signal. At sub-block 1126, the block 1120 may optionally include clipping peaks of the time domain signal that exceed a threshold to generate the clipped data channel signal. At sub-block 1128, the block 1120 may optionally include generating the clipped peak information describing at least some of the clipped peaks. Accordingly, the base station 102, the controller/processor 375, and/or the TX processor 316 executing the PSIM Tx component 198 and/or the clipping component 842 may provide means for performing peak suppression on the data channel 816 to generate a clipped data channel signal and clipped peak information.

At block 1130, the method 1100 may include assigning to each UE a portion of the clipped peak information based on the MCS for the respective UE. In an aspect, for example, the base station 102, the controller/processor 375, and/or the TX processor 316 may execute the PSIM Tx component 198 and/or the PSIM generator 844 to assign to each UE 104 a portion of the clipped peak information (e.g., groups 622, 624, 626) based on the MCS for the respective UE 104. For example, at sub-block 1132, the block 1130 may optionally include assigning an amount of clipped peak information sufficient to raise an expected signal to noise ratio (SNR) of the transport block for the respective UE to a level sufficient to decode the transport block for the respective UE based on the MCS for the respective UE. For instance, after decoding one or more incremental PSIM and reconstructing the data signal accordingly, the UE will get a data signal with a specific EVM. The remaining distortion causing this EVM will not limit the decoding performance if the EVM is smaller than the Rx SNR of the UE by a certain level (e.g., a few dBs). Because the MCS is selected according to the estimated or reported SNR at the receiver side, the PSIM generator 844 may divide the served UEs into "bins" according to their MCS. Each bin may contain one or more MCS values. Then, the total peak information may be divided into portions that will allow successful decoding of the highest MCS in each bin. The amount of peak information for a MCS may be computed from the energy of the remaining peaks that are not part of the relevant incremental PSIM and its preceding incremental PSIMs. In view of the foregoing, the base station 102, the controller/processor 375, and/or the TX processor 316 executing the PSIM Tx component 198 and/or the PSIM generator 844 may provide means for assigning to each UE a portion of the clipped peak information based on the MCS for the respective UE.

At block 1140, the method 1100 may include encoding the clipped peak information into a plurality of incremental PSIMs, each incremental PSIM including the portion of the clipped peak information assigned to at least the respective UE and encoded based on a MCS lower than the MCS for the respective UE. In an aspect, for example, the base station 102, the controller/processor 375, and/or the TX processor 316 may execute the PSIM Tx component 198 and/or the PSIM encoder 846 to encode the clipped peak information into a plurality of incremental PSIMs 632, 634, 636, each incremental PSIM including the portion of the clipped peak information assigned to at least the respective UE and encoded based on a MCS lower than the MCS for the respective UE. For example, if multiple UEs have the same MCS, a single incremental PSIM may be assigned to the multiple UEs and include the portion of clipped peak information assigned to each of the multiple UEs. The clipped peak information may be the same or different for the multiple UEs with the same MCS. In some implementations, in sub-block 1142, the block 1140 may optionally include ordering the plurality of incremental PSIMs in order of MCS from lowest to highest. Accordingly, the base station 102, the controller/processor 375, and/or the TX processor 316 executing the PSIM Tx component 198 and/or the PSIM encoder 846 may provide means for encoding the clipped peak information into a plurality of incremental PSIMs, each incremental PSIM including the portion of the clipped peak information assigned to a respective UE and encoded based on a MCS lower than the MCS for the respective UE.

At block 1150, the method 1100 may include transmitting the clipped data channel signal, the plurality of incremental PSIMs, and a respective DCI for each UE indicating the MCS for the respective UE and the respective transport block for the respective UE. In an aspect, for example, the base station 102, the controller/processor 375, and/or the TX processor 316 may execute the PSIM Tx component 198 and/or the transmitter component 852 to transmit the clipped data channel signal, the plurality of incremental PSIMs, and a respective DCI for each UE indicating the MCS for the respective UE and the respective transport block for the respective UE. For instance, at sub-block 1152, the block 1150 may optionally include transmitting a first PSIM DCI indicating resources for a first incremental PSIM and a MCS of the first incremental PSIM. Transmitting the plurality of incremental PSIMs may include transmitting the first incremental PSIM including the portion of the clipped peak information assigned to at least a first UE and a subsequent PSIM DCI for a subsequent incremental PSIM. The subsequent PSIM DCI may indicate resources for the subsequent incremental PSIM, a MCS of the subsequent incremental PSIM, and a data MCS to which the subsequent incremental PSIM is applicable. Accordingly, the base station 102, the controller/processor 375, and/or the TX processor 316 executing the PSIM Tx component 198 and/or the transmitter component 852 may provide means for transmitting the clipped data channel signal, the plurality of incremental PSIMs, and a respective DCI for each UE indicating the MCS for the respective UE and the respective transport block for the respective UE.

Figure 12:
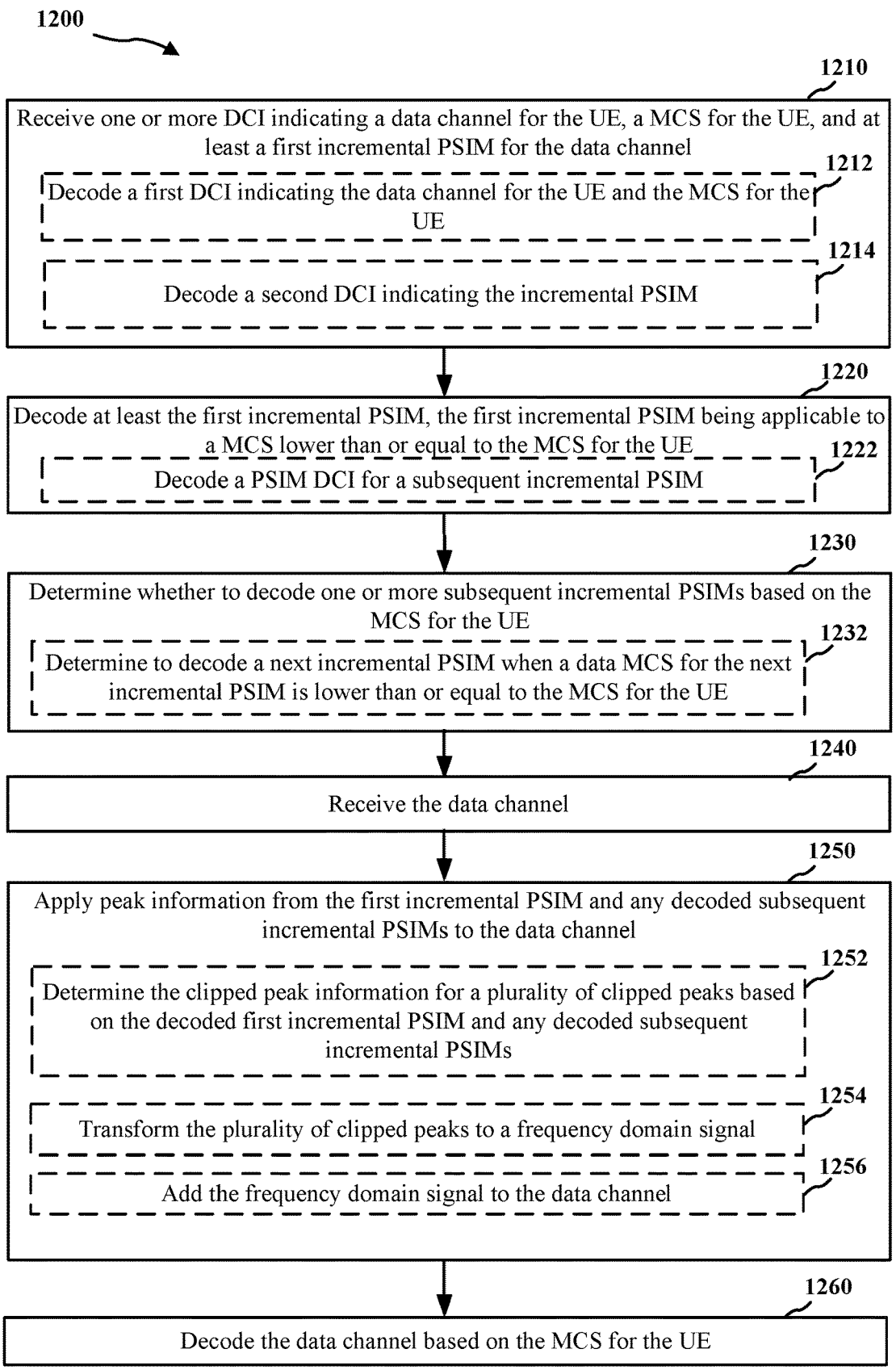
FIG. 12 is a flowchart of an example of a method of wireless communication for a receiving device.

FIG. 12 is a flowchart of an example method 1200 for receiving a PSIM channel for at least partially reconstructing an original signal from a clipped signal that has been received. The method 1200 may be performed by a UE (such as the UE 104, which may include the memory 360 and which may be the entire UE 104 or a component of the UE 104 such as the PSIM Rx component 140, TX processor 368, the RX processor 356, or the controller/processor 359). The method 1200 may be performed by the PSIM Rx component 140 in communication with the PSIM Tx component 198 of the base station 102.

At block 1210, the method 1200 may include receiving one or more DCIs indicating a data channel for the UE, a MCS for the UE, and at least a first incremental PSIM for the data channel. In an aspect, for example, the UE 104, the RX processor 356 and/or the controller/processor 359 may execute the PSIM Rx component 140, the receiver 141, and/or the receiver component 870 to receive one or more DCIs indicating a data channel for the UE, a MCS for the UE, and at least a first incremental PSIM for the data channel. For instance, at sub-block 1212, the block 1210 may optionally include decoding a first DCI (e.g., one of DCI 722, 724, 726) indicating the data channel for the UE and the MCS for the UE. At sub-block 1214, the block 1210 may optionally include decoding a second DCI (e.g., PSIM 0 DCI 720) indicating the incremental PSIM. Accordingly, the UE 104, the RX processor 356, and/or the controller/processor 359 executing the PSIM Rx component 140 and/or the receiver component 870 may provide means for receiving one or more DCIs indicating a data channel for the UE, a MCS for the UE, and at least a first incremental PSIM for the data channel.

At block 1220, the method 1200 may include decoding at least the first incremental PSIM, the first incremental PSIM being applicable to a MCS lower than or equal to the MCS for the UE. In an aspect, for example, the UE 104, the RX processor 356 and/or the controller/processor 359 may execute the PSIM Rx component 140 and/or the PSIM decoder 142 to decode at least the first incremental PSIM, the first incremental PSIM being applicable to a MCS lower than or equal to the MCS for the UE. For instance, at sub-block 1222 the block 1220 may optionally include decoding a PSIM DCI (e.g., PSIM DCI 732, 734) for a subsequent incremental PSIM (e.g., incremental PSIM 634, 636). Accordingly, the UE 104, the RX processor 356, and/or the controller/processor 359 executing the PSIM Rx component 140 and/or the PSIM decoder 142 may provide means for decoding at least the first incremental PSIM, the first incremental PSIM being applicable to a MCS lower than or equal to the MCS for the UE.

At block 1230, the method 1200 may include determining whether to decode one or more subsequent incremental PSIMs based on the MCS for the UE. In an aspect, for example, the UE 104, the RX processor 356 and/or the controller/processor 359 may execute the PSIM Rx component 140 and/or the incremental decoder 143 to determining whether to decode one or more subsequent incremental PSIMs based on the MCS for the UE. For instance, at sub-block 1232, the block 1230 may optionally include determining to decode a next incremental PSIM when a data MCS for the next incremental PSIM is lower than or equal to the MCS for the UE. Accordingly, the UE 104, the RX processor 356, and/or the controller/processor 359 executing the PSIM Rx component 140 and/or the incremental decoder 143 may provide means for determining whether to decode one or more subsequent incremental P SIMs based on the MCS for the UE.

At block 1240, the method 1200 may include receiving the data channel. In an aspect, for example, the UE 104, the RX processor 356 and/or the controller/processor 359 may execute the PSIM Rx component 140 and/or the receiver 141 to receiving the data channel. Accordingly, the UE 104, the RX processor 356, and/or the controller/processor 359 executing the PSIM Rx component 140 and/or the receiver 141 may provide means for receiving the data channel.

At block 1250, the method 1200 may include applying peak information from the first incremental PSIM and any decoded subsequent incremental PSIMs to the data channel. In an aspect, for example, the UE 104, the RX processor 356 and/or the controller/processor 359 may execute the PSIM Rx component 140 and/or the reconstruction component 144 to apply peak information from the first incremental PSIM and any decoded subsequent incremental PSIMs to the data channel to generate a reconstructed data channel. For instance, at sub-block 1252 the block 1250 may optionally include determining the clipped peak information for a plurality of clipped peaks based on the decoded first incremental PSIM and any decoded subsequent incremental PSIMs. At sub-block 1254, the block 1250 may optionally include transforming the plurality of clipped peaks to a frequency domain signal. At sub-block 1256, the block 1250 may optionally include adding the frequency domain signal to the data channel. For instance, adding the frequency domain signal to the data channel may include: expanding the data channel based on a precoding matrix; adding the plurality of clipped peaks to the expanded data channel; and reducing the data channel based on the precoding matrix. Accordingly, the UE 104, the RX processor 356, and/or the controller/processor 359 executing the PSIM Rx component 140 and/or the reconstruction component 144 may provide means for applying peak information from the first incremental PSIM and any decoded subsequent incremental PSIMs to the data channel to generate a reconstructed data channel.

At block 1260, the method 1200 may include decoding the reconstructed data channel based on the MCS for the UE. In an aspect, for example, the UE 104, the TX processor 368 and/or the controller/processor 359 may execute the PSIM Rx component 140 and/or the data decoder 145 to decode the reconstructed data channel based on the MCS for the UE. Accordingly, the UE 104, the TX processor 368, and/or the controller/processor 359 executing the PSIM Rx component 140 and/or the data decoder 145 may provide means for decoding the reconstructed data channel based on the MCS for the UE.

Some Further Example Implementations

A first example method of wireless communication, comprising: receiving one or more downlink control information (DCI) indicating a data channel for a user equipment (UE), a modulation and coding scheme (MCS) for the UE, and at least a first incremental peak suppression information message (PSIM) for the data channel; decoding at least the first incremental PSIM, the first incremental PSIM being applicable to a MCS lower than or equal to the MCS for the UE; determining whether to decode one or more subsequent incremental PSIMs based on the MCS for the UE; receiving the data channel; applying peak information from the first incremental PSIM and any decoded subsequent incremental PSIMs to the data channel to generate a reconstructed data channel; and decoding the reconstructed data channel based on the MCS for the UE.

The above first example method, wherein receiving the one or more DCI comprises decoding a first DCI indicating the data channel for the UE and the MCS for the UE.

Any of the above first example methods, wherein receiving the one or more DCI comprises decoding a second DCI indicating the first incremental PSIM.

Any of the above first example methods, wherein the second DCI indicates resources for the first incremental PSIM and a MCS of the first incremental PSIM.

Any of the above first example methods, wherein decoding at least the first incremental PSIM comprises decoding a PSIM DCI for a subsequent incremental PSIM.

Any of the above first example methods, wherein the PSIM DCI is encoded with the MCS of the first incremental PSIM.

Any of the above first example methods, wherein the PSIM DCI indicates resources for the subsequent incremental PSIM, a MCS of the subsequent incremental PSIM, and a data MCS to which the subsequent incremental PSIM is applicable.

Any of the above first example methods, wherein the resources for the subsequent incremental PSIM are indicated by a start location and a length.

Any of the above first example methods, wherein determining whether to decode the one or more subsequent incremental PSIMs comprises determining to decode a next incremental PSIM when a data MCS for the next incremental PSIM is lower than or equal to the MCS for the UE.

Any of the above first example methods, wherein applying the peak information of the first incremental PSIM and any decoded subsequent incremental PSIMs to the data channel comprises: determining clipped peak information for a plurality of clipped peaks based on the decoded first incremental PSIM and any decoded subsequent incremental PSIMs; transforming the plurality of clipped peaks to a frequency domain signal; and adding the frequency domain signal to the data channel.

Any of the above first example methods, wherein adding the plurality of clipped peaks to the data channel comprises: expanding the data channel based on a precoding matrix; adding the plurality of clipped peaks to the expanded data channel; and reducing the data channel based on the precoding matrix.

Any of the above first example methods, wherein each of the one or more subsequent incremental P SIMs is encoded with an incrementally higher MCS.

A second example method of wireless communication, comprising: generating a data channel including a transport block for each of two or more user equipments (UEs), each transport block associated with a modulation and coding scheme (MCS) for a respective UE; performing peak suppression on the data channel to generate a clipped data channel signal and clipped peak information; assigning to each UE a portion of the clipped peak information based on the MCS for the respective UE; encoding the clipped peak information into a plurality of incremental peak suppression information messages (PSIMs), each incremental PSIM including the portion of the clipped peak information assigned to at least the respective UE and encoded based on a MCS lower than the MCS for the respective UE; and transmitting the clipped data channel signal, the plurality of incremental PSIMs, and a respective DCI for each UE indicating the MCS for the respective UE and the respective transport block for the respective UE.

The above second example method, wherein performing peak suppression comprises:

generating a frequency domain signal based on the data channel transport blocks;

transforming the frequency domain signal into a time domain signal; clipping peaks of the time domain signal that exceed a threshold to generate the clipped data channel signal; and generating the clipped peak information describing at least some of the clipped peaks.

Any of the above second example methods, wherein assigning to each UE the portion of the clipped peak information based on the MCS for the respective UE comprises assigning an amount of clipped peak information sufficient to raise an expected signal to noise ratio (SNR) of the transport block for the respective UE to a level sufficient to decode the transport block for the respective UE based on the MCS for the respective UE.

Any of the above second example methods, wherein encoding the clipped peak information into the plurality of incremental PSIMs comprises ordering the plurality of incremental PSIMs in order of MCS from lowest to highest.

Any of the above second example methods, wherein transmitting the plurality of incremental PSIMs comprises transmitting a first PSIM DCI indicating resources for a first incremental PSIM and a MCS of the first incremental PSIM.

Any of the above second example methods, wherein transmitting the plurality of incremental P SIMs comprises transmitting the first incremental PSIM including the portion of the clipped peak information assigned to at least a first UE and a subsequent PSIM DCI for a subsequent incremental PSIM.

Any of the above second example methods, wherein the subsequent PSIM DCI indicates resources for the subsequent incremental PSIM, a MCS of the subsequent incremental PSIM, and a data MCS to which the subsequent incremental PSIM is applicable.

Any of the above second example methods, wherein the resources for the subsequent incremental PSIM are indicated by a start location and a length.

A first example apparatus for wireless communication, comprising: a memory storing computer-executable instructions; and at least one processor coupled to the memory and configured to execute the computer-executable instructions to: receive one or more downlink control information (DCI) indicating a data channel for a user equipment (UE), a modulation and coding scheme (MCS) for the UE, and at least a first incremental peak suppression information message (PSIM) for the data channel; decode at least the first incremental PSIM, the first incremental PSIM being applicable to a MCS lower than or equal to the MCS for the UE; determine whether to decode one or more subsequent incremental PSIMs based on the MCS for the UE; receive the data channel; apply peak information from the first incremental PSIM and any decoded subsequent incremental PSIMs to the data channel; and decode the data channel based on the MCS for the UE.

The above first example apparatus, wherein the at least one processor is configured to: decode a first DCI indicating the data channel for the UE and the MCS for the UE; and decode a second DCI indicating the first incremental PSIM.

Any of the above first example apparatuses, wherein the at least one processor is configured to decode a PSIM DCI for a subsequent incremental PSIM within the first incremental PSIM, wherein the PSIM DCI is encoded with the MCS of the first incremental PSIM, wherein the PSIM DCI indicates resources for the subsequent incremental PSIM, a MCS of the subsequent incremental PSIM, and a data MCS to which the subsequent incremental PSIM is applicable.

Any of the above first example apparatuses, wherein the at least one processor is configured to determine to decode a next incremental PSIM when a data MCS for the next incremental PSIM is lower than or equal to the MCS for the UE.

Any of the above first example apparatuses, wherein each of the one or more subsequent incremental PSIMs is encoded with an incrementally higher MCS.

A second example apparatus for wireless communication, comprising: a memory storing computer-executable instructions; and at least one processor coupled to the memory and configured to execute the computer-executable instructions to: generate a data channel including a transport block for each of two or more user equipments (UEs), each transport block associated with a modulation and coding scheme (MCS) for a respective UE; perform peak suppression on the data channel to generate a clipped data channel signal and clipped peak information; assign to each UE a portion of the clipped peak information based on the MCS for the respective UE; encode the clipped peak information into a plurality of incremental PSIMs, each incremental PSIM including the portion of the clipped peak information assigned to at least the respective UE and encoded based on a MCS lower than the MCS for the respective UE; and transmit the clipped data channel signal, the plurality of incremental PSIMs, and a respective DCI for each UE indicating the MCS for the respective UE and the respective transport block for the respective UE.

The above second example apparatuses wherein the at least one processor is configured to: generate a frequency domain signal based on the data channel transport blocks; transform the frequency domain signal into a time domain signal; clip peaks of the time domain signal that exceed a threshold to generate the clipped data channel signal; and generate the clipped peak information describing the clipped peaks.

Any of the above second example apparatuses, wherein the at least one processor is configured to assign an amount of clipped peak information sufficient to raise an expected signal to noise ratio (SNR) of the transport block for the respective UE to a level sufficient to decode the transport block for the respective UE based on the MCS for the respective UE.

Any of the above second example apparatuses, wherein the at least one processor is configured to order the plurality of incremental P SIMs in order of MCS from lowest to highest.

Any of the above second example apparatuses, wherein the at least one processor is configured to: transmit, on a control channel, a first PSIM DCI indicating resources for a first incremental PSIM and a MCS of the first incremental PSIM; and transmit the first incremental PSIM including the portion of the clipped peak information assigned to at least a first UE and a subsequent PSIM DCI for a subsequent incremental PSIM, wherein the subsequent PSIM DCI indicates resources for the subsequent incremental PSIM, a MCS of the subsequent incremental PSIM, and a data MCS to which the subsequent incremental PSIM is applicable.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The invention claimed is:

1. A method of wireless communication, comprising:
receiving one or more downlink control information (DCI) indicating a data channel for a user equipment (UE), a modulation and coding scheme (MCS) for the UE, and at least a first incremental peak suppression information message (PSIM) for the data channel;
decoding at least the first incremental PSIM, the first incremental PSIM being applicable to a MCS lower than or equal to the MCS for the UE;
determining whether to decode one or more subsequent incremental PSIMs based on the MCS for the UE;
receiving the data channel;
applying peak information from the first incremental PSIM and any decoded subsequent incremental PSIMs to the data channel to generate a reconstructed data channel; and
decoding the reconstructed data channel based on the MCS for the UE.

2. The method of claim 1, wherein receiving the one or more DCI comprises decoding a first DCI indicating the data channel for the UE and the MCS for the UE.

3. The method of claim 2, wherein receiving the one or more DCI comprises decoding a second DCI indicating the first incremental PSIM.

4. The method of claim 3, wherein the second DCI indicates resources for the first incremental PSIM and a MCS of the first incremental PSIM.

5. The method of claim 1, wherein decoding at least the first incremental PSIM comprises decoding a PSIM DCI for a subsequent incremental PSIM.

6. The method of claim 5, wherein the PSIM DCI is encoded with the MCS of the first incremental PSIM.

7. The method of claim 5, wherein the PSIM DCI indicates resources for the subsequent incremental PSIM, a MCS of the subsequent incremental PSIM, and a data MCS to which the subsequent incremental PSIM is applicable.

8. The method of claim 7, wherein the resources for the subsequent incremental PSIM are indicated by a start location and a length.

9. The method of claim 1, wherein determining whether to decode the one or more subsequent incremental PSIMs comprises determining to decode a next incremental PSIM when a data MCS for the next incremental PSIM is lower than or equal to the MCS for the UE.

10. The method of claim 1, wherein applying the peak information of the first incremental PSIM and any decoded subsequent incremental PSIMs to the data channel comprises:
determining clipped peak information for a plurality of clipped peaks based on the decoded first incremental PSIM and any decoded subsequent incremental PSIMs;

transforming the plurality of clipped peaks to a frequency domain signal; and adding the frequency domain signal to the data channel.

11. The method of claim 10, wherein adding the plurality of clipped peaks to the data channel comprises:

expanding the data channel based on a precoding matrix;
adding the plurality of clipped peaks to the expanded data channel; and
reducing the data channel based on the precoding matrix.

12. The method of claim 1, wherein each of the one or more subsequent incremental PSIMs is encoded with an incrementally higher MCS.

13. A method of wireless communication, comprising:
generating a data channel including a transport block for each of two or more user equipments (UEs), each transport block associated with a modulation and coding scheme (MCS) for a respective UE;
performing peak suppression on the data channel to generate a clipped data channel signal and clipped peak information;
assigning to each UE a portion of the clipped peak information based on the MCS for the respective UE;
encoding the clipped peak information into a plurality of incremental peak suppression information messages (PSIMs), each incremental PSIM including the portion of the clipped peak information assigned to at least the respective UE and encoded based on a MCS lower than the MCS for the respective UE; and
transmitting the clipped data channel signal, the plurality of incremental PSIMs, and a respective DCI for each UE indicating the MCS for the respective UE and the respective transport block for the respective UE.

14. The method of claim 13, wherein performing peak suppression comprises:
generating a frequency domain signal based on the transport blocks of the data channel;
transforming the frequency domain signal into a time domain signal;
clipping peaks of the time domain signal that exceed a threshold to generate the clipped data channel signal; and
generating the clipped peak information describing at least some of the clipped peaks.

15. The method of claim 13, wherein assigning to each UE the portion of the clipped peak information based on the MCS for the respective UE comprises assigning an amount of clipped peak information sufficient to raise an expected signal to noise ratio (SNR) of the transport block for the respective UE to a level sufficient to decode the transport block for the respective UE based on the MCS for the respective UE.

16. The method of claim 13, wherein encoding the clipped peak information into the plurality of incremental PSIMs comprises ordering the plurality of incremental PSIMs in order of MCS from lowest to highest.

17. The method of claim 13, wherein transmitting the plurality of incremental PSIMs comprises transmitting a first PSIM DCI indicating resources for a first incremental PSIM and a MCS of the first incremental PSIM.

18. The method of claim 17, wherein transmitting the plurality of incremental PSIMs comprises transmitting the first incremental PSIM including the portion of the clipped peak information assigned to at least a first UE and a subsequent PSIM DCI for a subsequent incremental PSIM.

19. The method of claim 18, wherein the subsequent PSIM DCI indicates resources for the subsequent incremental PSIM, a MCS of the subsequent incremental PSIM, and a data MCS to which the subsequent incremental PSIM is applicable.

20. The method of claim 19, wherein the resources for the subsequent incremental PSIM are indicated by a start location and a length.

21. An apparatus for wireless communication, comprising:
a memory storing computer-executable instructions; and
at least one processor coupled to the memory and configured to execute the computer-executable instructions to:
receive one or more downlink control information (DCI) indicating a data channel for a user equipment (UE), a modulation and coding scheme (MCS) for the UE, and at least a first incremental peak suppression information message (PSIM) for the data channel;
decode at least the first incremental PSIM, the first incremental PSIM being applicable to a MCS lower than or equal to the MCS for the UE;
determine whether to decode one or more subsequent incremental PSIMs based on the MCS for the UE;
receive the data channel;
apply peak information from the first incremental PSIM and any decoded subsequent incremental PSIMs to the data channel; and
decode the data channel based on the MCS for the UE.

22. The apparatus of claim 21, wherein the at least one processor is configured to:
decode a first DCI indicating the data channel for the UE and the MCS for the UE; and
decode a second DCI indicating the first incremental PSIM.

23. The apparatus of claim 21, wherein the at least one processor is configured to decode a PSIM DCI for a subsequent incremental PSIM within the first incremental PSIM, wherein the PSIM DCI is encoded with the MCS of the first incremental PSIM, wherein the PSIM DCI indicates resources for the subsequent incremental PSIM, a MCS of the subsequent incremental PSIM, and a data MCS to which the subsequent incremental PSIM is applicable.

24. The apparatus of claim 21, wherein the at least one processor is configured to determine to decode a next incremental PSIM when a data MCS for the next incremental PSIM is lower than or equal to the MCS for the UE.

25. The apparatus of claim 21, wherein each of the one or more subsequent incremental PSIMs is encoded with an incrementally higher MCS.

26. An apparatus for wireless communication, comprising:
a memory storing computer-executable instructions; and
at least one processor coupled to the memory and configured to execute the computer-executable instructions to:
generate a data channel including a transport block for each of two or more user equipments (UEs), each transport block associated with a modulation and coding scheme (MCS) for a respective UE;
perform peak suppression on the data channel to generate a clipped data channel signal and clipped peak information;
assign to each UE a portion of the clipped peak information based on the MCS for the respective UE;
encode the clipped peak information into a plurality of incremental PSIMs, each incremental PSIM including the portion of the clipped peak information assigned to at least the respective UE and encoded based on a MCS lower than the MCS for the respective UE; and transmit the clipped data channel signal, the plurality of incremental PSIMs, and a respective DCI for each UE indicating the MCS for the respective UE and the respective transport block for the respective UE.

27. The apparatus of claim 26, wherein the at least one processor is configured to:

generate a frequency domain signal based on the transport blocks of the data channel;

transform the frequency domain signal into a time domain signal;

clip peaks of the time domain signal that exceed a threshold to generate the clipped data channel signal; and generate the clipped peak information describing the clipped peaks.

28. The apparatus of claim 26, wherein the at least one processor is configured to assign an amount of clipped peak information sufficient to raise an expected signal to noise ratio (SNR) of the transport block for the respective UE to a level sufficient to decode the transport block for the respective UE based on the MCS for the respective UE.

29. The apparatus of claim 26, wherein the at least one processor is configured to order the plurality of incremental PSIMs in order of MCS from lowest to highest.

30. The apparatus of claim 26, wherein the at least one processor is configured to:

transmit, on a control channel, a first PSIM DCI indicating resources for a first incremental PSIM and a MCS of the first incremental PSIM; and transmit the first incremental PSIM including the portion of the clipped peak information assigned to at least a first UE and a subsequent PSIM DCI for a subsequent incremental PSIM, wherein the subsequent PSIM DCI indicates resources for the subsequent incremental PSIM, a MCS of the subsequent incremental PSIM, and a data MCS to which the subsequent incremental PSIM is applicable.

* * * * *